(12) United States Patent
Rosenfield

(10) Patent No.: US 9,416,753 B2
(45) Date of Patent: Aug. 16, 2016

(54) ROCKET DELAY APPARATUSES, SYSTEMS AND METHODS

(71) Applicant: Gary C. Rosenfield, Washington, UT (US)

(72) Inventor: Gary C. Rosenfield, Washington, UT (US)

(*) Notice: Subject to any disclaimer, the term of this patent is extended or adjusted under 35 U.S.C. 154(b) by 0 days.

(21) Appl. No.: 14/187,140

(22) Filed: Feb. 21, 2014

(65) Prior Publication Data

US 2014/0230678 A1 Aug. 21, 2014

Related U.S. Application Data

(60) Provisional application No. 61/767,767, filed on Feb. 21, 2013.

(51) Int. Cl.
*F02K 9/95* (2006.01)
*F02K 9/26* (2006.01)
*F42C 19/08* (2006.01)

(52) U.S. Cl.
CPC ... *F02K 9/95* (2013.01); *F02K 9/26* (2013.01); *F42C 19/0815* (2013.01)

(58) Field of Classification Search
CPC .......................... F41C 19/0815; F41C 19/0819
USPC ............ 102/202, 287, 289, 290, 282; 60/770, 60/394
See application file for complete search history.

(56) References Cited

U.S. PATENT DOCUMENTS

| 5,309,712 A | 5/1994 | Mund, Jr. | |
| 6,079,202 A * | 6/2000 | Cesaroni | F02K 9/24 102/282 |
| 2010/0024428 A1* | 2/2010 | Rosenfield | F02K 9/34 60/770 |

OTHER PUBLICATIONS

"AeroTech Endorses Consumer Adjustment of RMS™ Delays", AeroTech News Archive, AeroTech Consumer Aerospace Website, article dated: Apr. 12, 2005, Date Accessed: Oct. 3, 2014, RCS Rocket Motor Components, Inc., http://www.aerotech-rocketry.com/news.aspx?y=2005.
"AeroTech Releases RMS™ Delay Drilling Tool", AeroTech News Archive, AeroTech Consumer Aerospace Website, article dated: Aug. 26, 2010, Date Accessed: Oct. 3, 2014, http://www.aerotech-rocketry.com/news.aspx?y=2010.
"AeroTech Develops Drilling Adapter for Adjusting RMS-Plus™ Delays", AeroTech News Archive, AeroTech Consumer Aerospace Website, articles dated: Nov. 14, 2005, Date Accessed: Oct. 3, 2014, RCS Rocket Motor Components, Inc., http://www.aerotech-rocketry.com/news.aspx?y=2005.
International Search Report (ISR) and The Written Opinion of the International Searching Authority, International Application No. PCT/US2014/017834 International Filing Date Feb. 21, 2014, Date of Mailing ISR Aug. 25, 2014, 27 pages, United States Patent Office, Alexandria Virginia.

* cited by examiner

*Primary Examiner* — Samir Abdosh
*Assistant Examiner* — John D Cooper
(74) *Attorney, Agent, or Firm* — Peter B. Scull; Hamilton DeSanctis & Cha LLP

(57) ABSTRACT

Delay tools, systems and methods for achieving a selection of alternative delay times, a tool of which including a body, a drill bit operable relative to the body and a knob operably connected to the drill bit, and operably disposed relative to the body for engagement of the body with a rocket motor bulkhead and the drill both relative to a delay to provide for achieving a selection of alternative delay times.

1 Claim, 21 Drawing Sheets

ROCKET DELAY APPARATUSES, SYSTEMS AND METHODS

CROSS-REFERENCE TO RELATED APPLICATIONS

This case is a non-provisional of and claims the benefit of priority to provisional application, No. 61/767,767, filed Feb. 21, 2013, the entire disclosure and claims of which hereby being incorporated herein in their entireties as if fully set forth here.

BACKGROUND

Numerous kinds and types of rocket systems have been developed particularly for use by rocket hobbyists. Generally speaking, rocket systems particularly used with model or hobby rockets are typically either a single-use type, limited re-use type or may employ a re-loadable system or kit. Some of these prior systems nevertheless still possess some disadvantages, including often complicated mechanisms or limited manipulability of controlled substances, the controlled substances usually being the propellant grains and/or consumable delay elements. These are often referred to as pyrotechnic elements and need appropriate manipulation tools and procedures for use therewith.

SUMMARY

Disclosed here are delay modifiable rockets, rocket motors and/or delay manipulation tools and/or methods for altering the timing of the delay to be provided thereby. Such are particularly useful either for a rocket motor for one or more of limited re-use, single use or a reloadable rocket motor system.

These and still further aspects as shall hereinafter appear are readily fulfilled by the present disclosure in a remarkably unexpected manner as will be readily discerned from the following detailed description of exemplary implementations hereof especially when read in conjunction with the accompanying drawings in which like parts bear like numerals throughout the several views.

DETAILED DESCRIPTION

Figure 1:
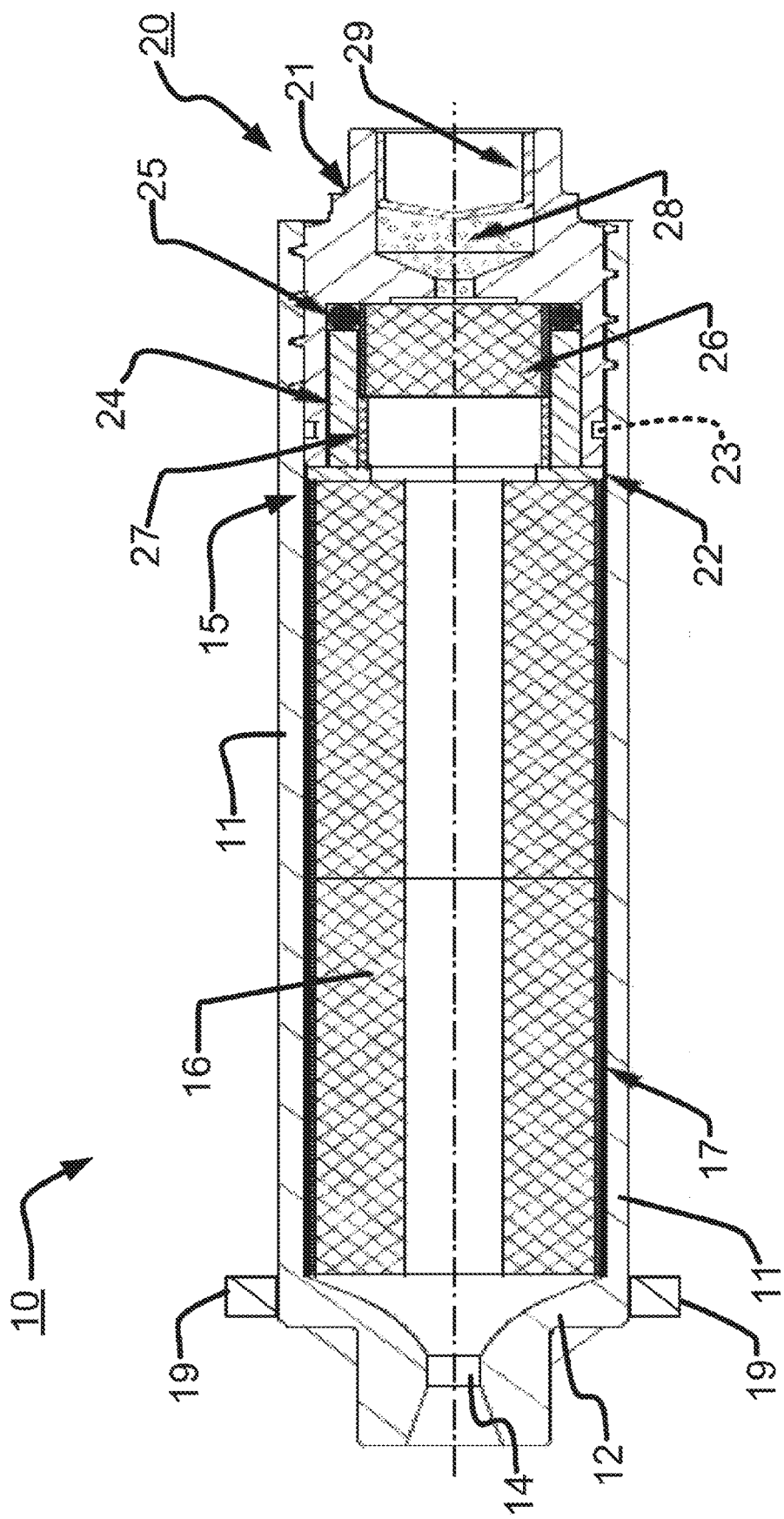
FIG. 1 is a cross-sectional view of an exemplar rocket motor according hereto.

As summarized above, and set forth in more detail hereinbelow, disclosed here are delay manipulatable rocket systems, rocket motor apparatuses, delay manipulation tools, systems and methods for delay manipulation as may particularly be useful either for a rocket motor for one or more of single use, limited re-use or a reloadable rocket motor systems. In some implementations hereof; provided are single use motors with modifiable delays modified in distinctive ways; and/or, implementations may include single use motors with distinctive modifiability/variability of the size/amount of the ejection charge (e.g., the diameter, the bigger or smaller size of a parachute compartment may need more ejection charge for operation, and yet, too much can cause undesirable breakage of the payload and/or rocket or rocket motor). For delay modification for conventional motors, a user would need to break open a pre-packaged ejection charge, which has heretofore been undesirable. Indeed variability in ejection charge size has typically required NAR/NFPA certification; i.e., consumer rocketry rules haven't allowed consumer modified ejection or delay modification unless pre-certified by the NFPA. Also, conventional rocket motor systems have not structurally allowed delay modification easily; e.g., single use motors typically have the delay bulkhead pre-affixed to the propellant chamber making access via the propellant side infeasible, and have the ejection charge pre-loaded in the ejection well, making access to the delay not possible. Reloadable motors conventionally provide similar problems in many designs where ejection side access to the delay is often not available and propellant side access to the delay is not direct either. Moreover, disclosed here are options such that one tool may be a substantially universal tool—for single use and for reloadable motor systems, either for modification from the ejection end or the propellant side; i.e., delay modification according hereto may be achieved from the ejection side also.

Rocket systems with the delay manipulability and/or with which exemplar delay tools hereof may be used will first be described briefly, with details of manipulation and alternative exemplar delay tools then addressed. The current implementations of rocket systems generally include either single use or limited use systems or reloadable rocket motor systems. Generally, component parts and/or kits may be provided for loadable, typically single use rockets and/or for limited re-use or for reloadable use rocket systems. All these types of implementations generally include: a rocket motor housing, the rocket motor housing adapted to contain propellant; an aft closure with a nozzle, the aft closure connected or connectable to the housing; a forward closure connected or connectable to the housing; wherein one or both of the aft closure and the forward closure are connectable to the housing in a manner adapted for one or more of limited re-use or single use or, as described further below, reloadable, re-usable rocket motor implementations.

In many implementations of limited or single use motors, as a first set of examples herein, the rocket motor is made loadable by insertion by the end-user of the propellant and any delay and/or ejection charge or charges followed by or with the single or limited use attachment of the forward and/or aft closures. The closures may be permanently affixed for a single use system, or removably loaded for limited re-use. On the other hand, in many implementations of reloadable rocket motor systems, the housing and aft closure, with nozzle, may be either permanently affixed together or more often detachably attachable to each other as by being respectively removably connectable, as in an example, where they may be cooperatively threaded for a screwing together and un-screwable removal from each other. The forward closure may then be either permanently affixed in such a reloadable system, or it may also be removably disposed for full or limited re-use. In such cases, the reloadable rocket motor is loaded by insertion by the end-user of the propellant and any delay and/or ejection charge or charges whether through the aft or forward end; then, the aft or the forward closure or both would attached/inserted to complete the loading. Thus, a variety of possible implementations, whether of the aft or forward closure may be removably attachable or either may be pre-affixed to the housing, pre-molded as such or permanently or substantially permanently connected, with loading of the housing through the alternate opening closable by a closure member. In such cases also, the other closure may then be connected permanently or substantially permanently after loading for a removably connectable re-use.

Such rocket motor casings may thus be simply loadable and may be adapted for one or more of limited re-use, single use or reloadable use in that one or both of the aft closure and the forward closure are connected or connectable, perhaps removably so, to the casing in a manner whereby one or the other may be pre-affixed or also removably attachable to the casing. If pre-affixed, whether integrally formed with, or later attached thereto in a permanent or substantially permanent form, this may ease the loading of the motor for use, and in some cases, re-use, reloadable or otherwise.

Even so, some more detailed views of some overall views will be first described for context, with reference to the drawing figures, including assembly and operation instructions for each of a limited use, or re-use or reloadable systems (also referred to as an LU or RMS system herein), and a single use system (also referred to as an SU system or MR system herein). First, described here is a sample listing of some general parts shown in operable disposition and/or connection with or relative to each other, which parts may be used in either or both of such types of rocket motor systems. Referring first to drawing FIG. 1, a rocket motor apparatus or system 10 is shown having a casing 11, with a loadable (single use) or re-loadable (herein, limited re-use) or reloadable (RMS) kit 15 (generally the parts disposed or to-be-disposed within casing 11). Some distinctions in some kits 15 may be identified where single use or re-use or reloadable may be available, or desired (see e.g., the examples of FIGS. 12 and 13, below).

As shown in more detail for example in FIG. 1 is a single or limited re-use implementation 10 with a fixedly attached (i.e., not removable) aft closure 12 (a re-loadable alternative is shown in more detail and described more specifically relative to FIGS. 12-13, below). I.e., the casing 11 in this example has an aft closure 12 built-in, as in either integrally formed therewith or at some point affixed thereto permanently, or substantially permanently. Although the present developments can also be used with removable aft closure implementations, this first description will be of the fixed aft closure type, though the delay manipulation operability would also be functional within the following description even if a fixed forward closure system is used. A nozzle 14 is shown built-into the aft closure 12, and thus forms a part of the assembly of the casing 11. Note that although the aft closure 12 is shown pre-affixed to the casing 11 in some of the drawing examples herein, it may be that the forward closure element 21 (see description thereof below) is pre-affixed to the casing 11, with the aft closure 12 to be connectable and thus later connected to the casing after loading of the interior elements.

Continuing with a description of some exemplar elements in FIG. 1 (see also FIG. 7*a*), a load/reload kit 15 may include a propellant grain 16 with a liner (often a long paper tube) 17, and a forward closure assembly 20, which may include a forward closure element 21 (sometimes also/alternatively referred to as a bulkhead), a forward insulator 22 (typically a black fiber washer) between the propellant and the fore closure, a forward closure o-ring 23 (indicated with a leader line in dashed line form in FIG. 1 (and also FIG. 3, below) as this may be a typical option for re-use, but likely not typically used for single-use as an epoxy or other permanent seal may be used instead (see FIGS. 3 and 7, below), a delay insulator 24, a delay o-ring 25, a delay element 26, a delay spacer 27, an ejection charge 28 with ejection charge retainer cap 29 (often a rubber cap) (typically, the ejection charge may be contained within a discrete storage/transport container (not shown)).

Figure 2:
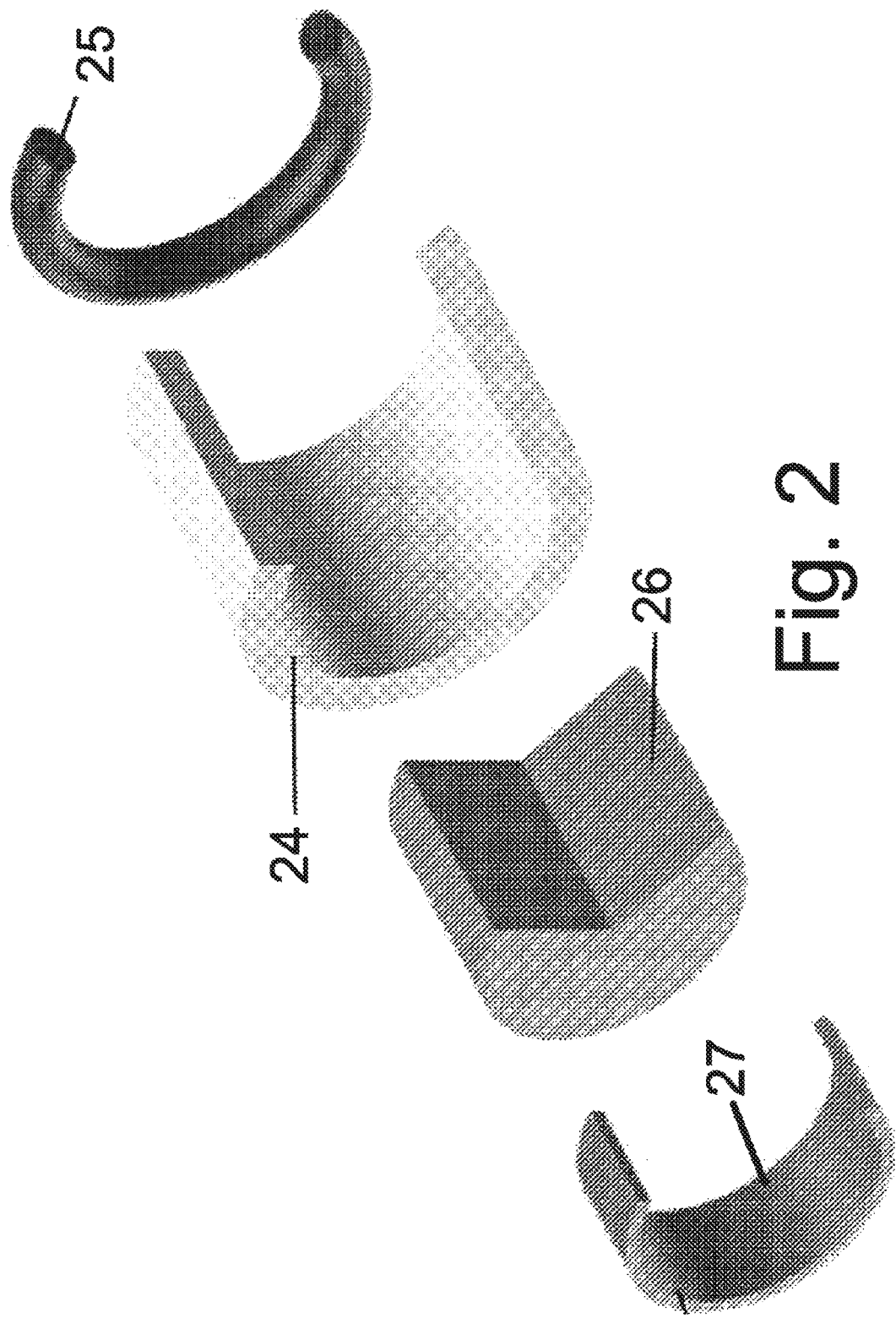
FIG. 2 is an exploded partially sectional and isometric view of a portion of an exemplar rocket, particularly of parts of an ejection delay assembly thereof.
Figure 3:
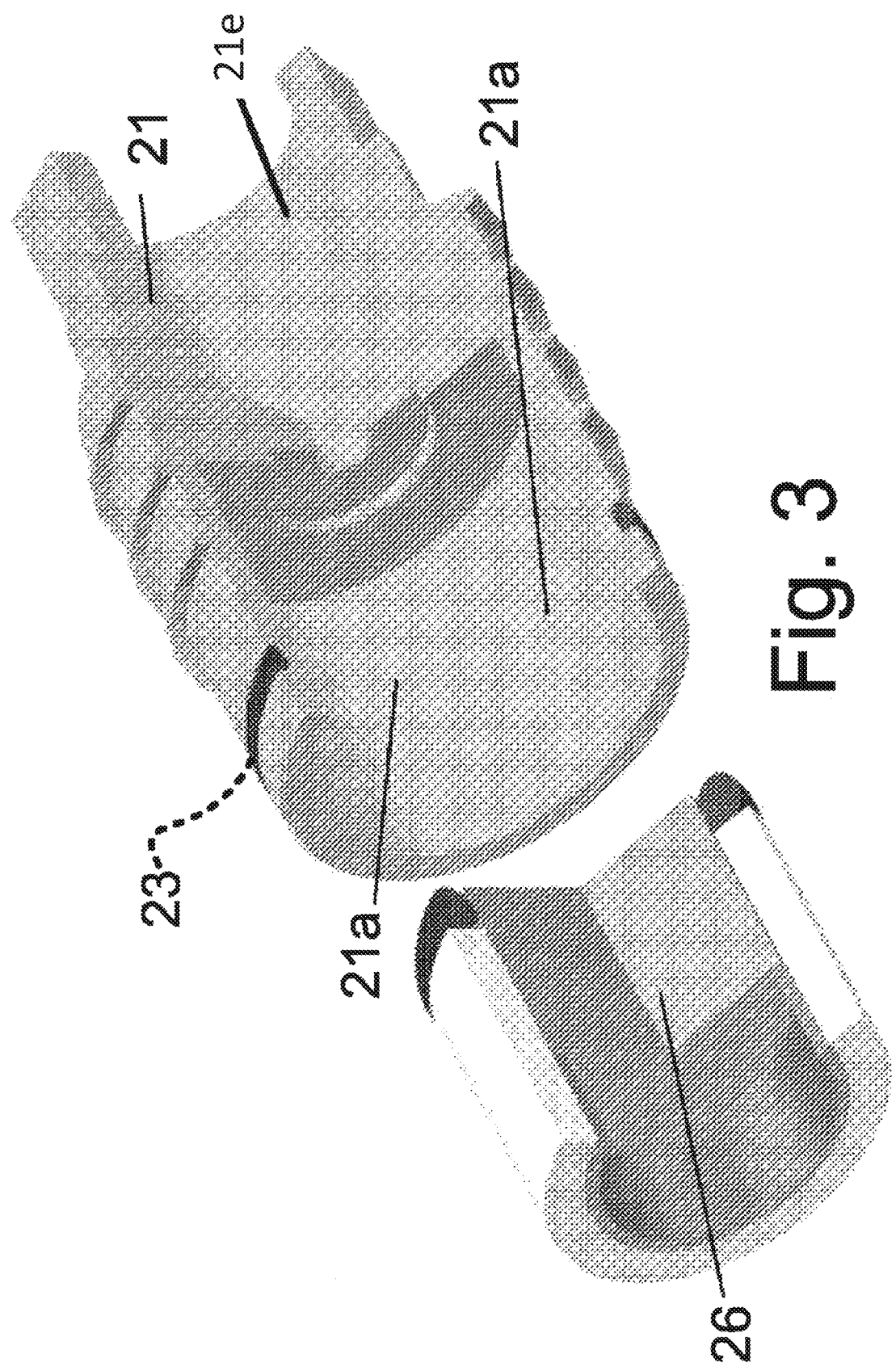
FIG. 3 is an exploded, partially sectional and isometric view of an exemplar forward closure assembly with an ejection delay assembly which may be used therewith.
Figure 4:
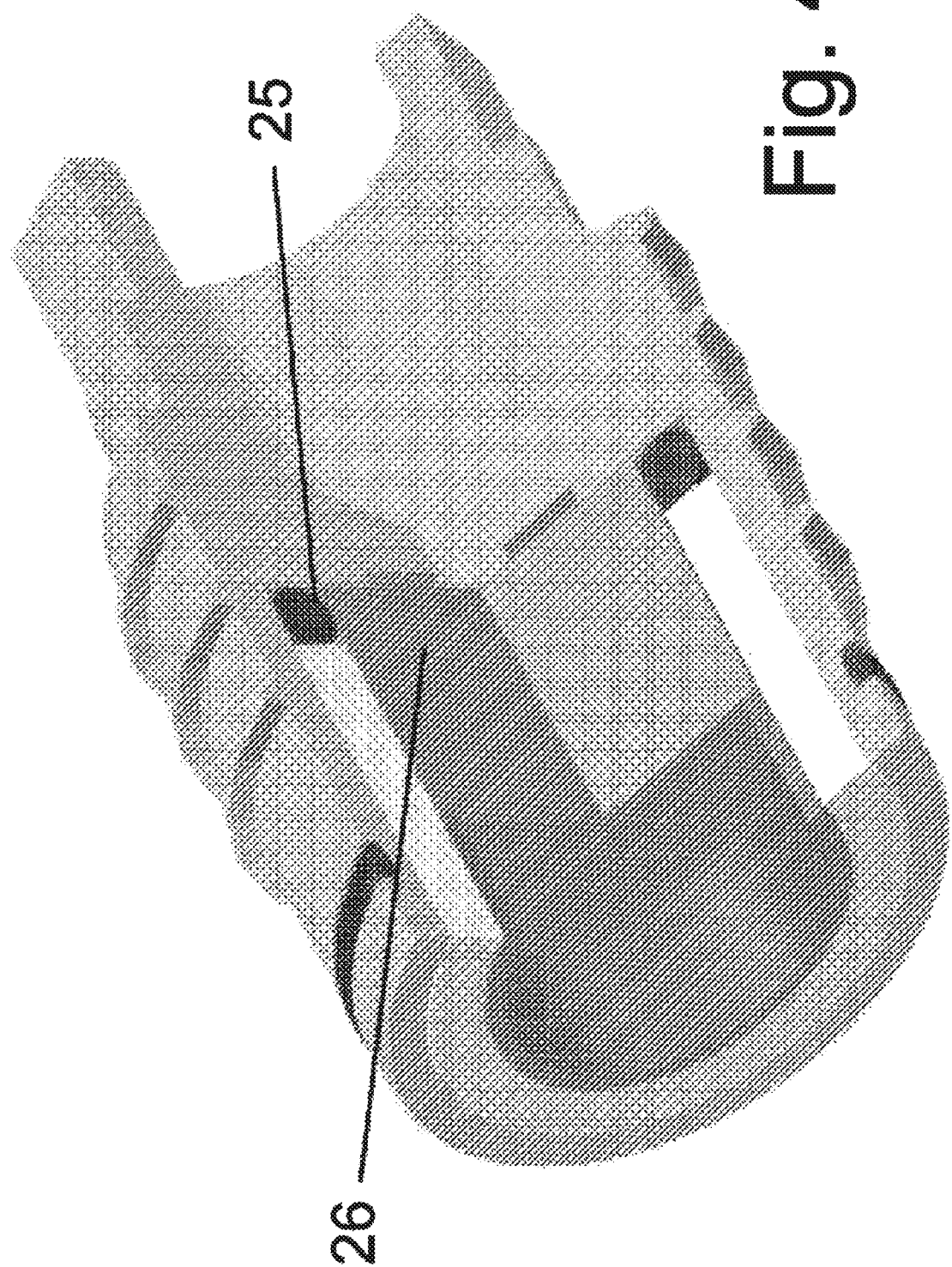
FIG. 4 is an isometric, partially cut-away view of an exemplar forward closure assembly with an ejection delay assembly disposed therein.
Figures 7A, 7B:
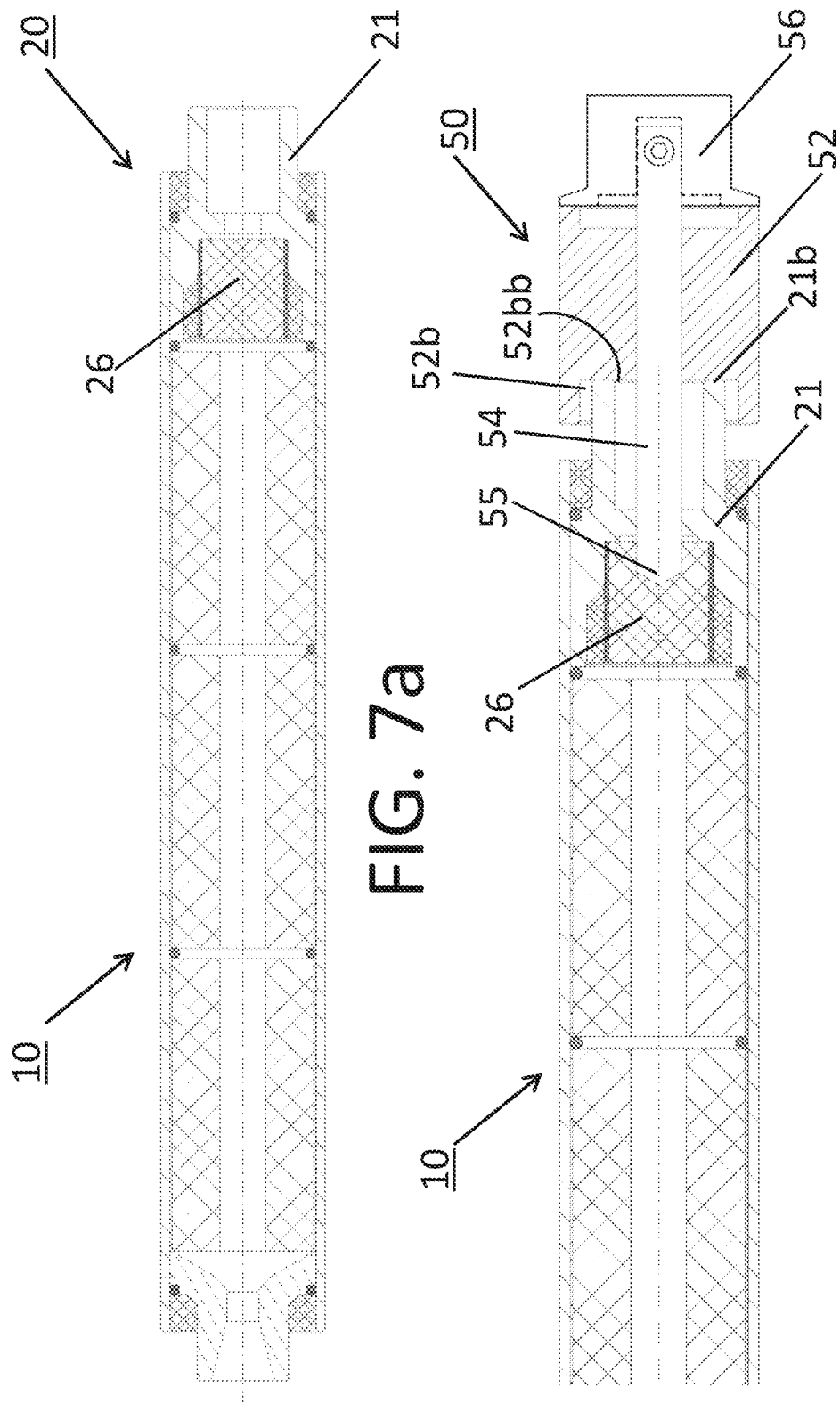
FIG. 7, which includes and is defined by sub-part FIGS. 7a and 7b, provides cross-sectional views of a rocket motor and delay (FIG. 7a) and a rocket motor and delay as in FIGS. 1-4 and a delay tool as in FIGS. 5 and 6 applied thereto (FIG. 7b)

A more detailed assembly operation is described in the following, particularly with reference to FIGS. 2-4 and 14-18, inter alia. A first set of such assembly operations, as for example in the assembly of a forward closure which is not pre-affixed to a casing, may include the following. A light coat of an acceptable rocket motor grease may be applied to any o-rings, particularly to the delay o-ring 25, and to the forward closure o-ring 23, if used. FIG. 2 shows an assembly of a delay system, e.g., of a delay element 26 within an insulator 24 with a spacer 27 and an o-ring 25. The delay element 26, delay insulator 24, delay spacer 27 and delay o-ring 25 may then be assembled as shown, particularly in moving from the exploded view of FIG. 2 to the assembled view of FIG. 3. Then as indicated in moving from FIG. 3 to FIG. 4, the delay charge assembly (of FIG. 3) may be inserted into the delay cavity 21*a* (which might be lightly greased) of forward closure 21, delay o-ring 25 end first, until it is seated against the forward end of the forward closure 21. The other well 21*e* is the ejection well for the ejection charge (described further below). Note it may be that the delay elements (24, 25, 26 and/or 27) of FIGS. 2 and 3 are pre-assembled, but in other cases, perhaps, not pre-assembled, thus rather one or more at a time inserted within the cavity 21a in appropriate order. In either case, the resulting disposition shown in FIG. 4 might be achieved. Disposition within the rocket motor may then be made such as is shown in FIGS. 1 and 7a for two alternative examples.

Figure 5:
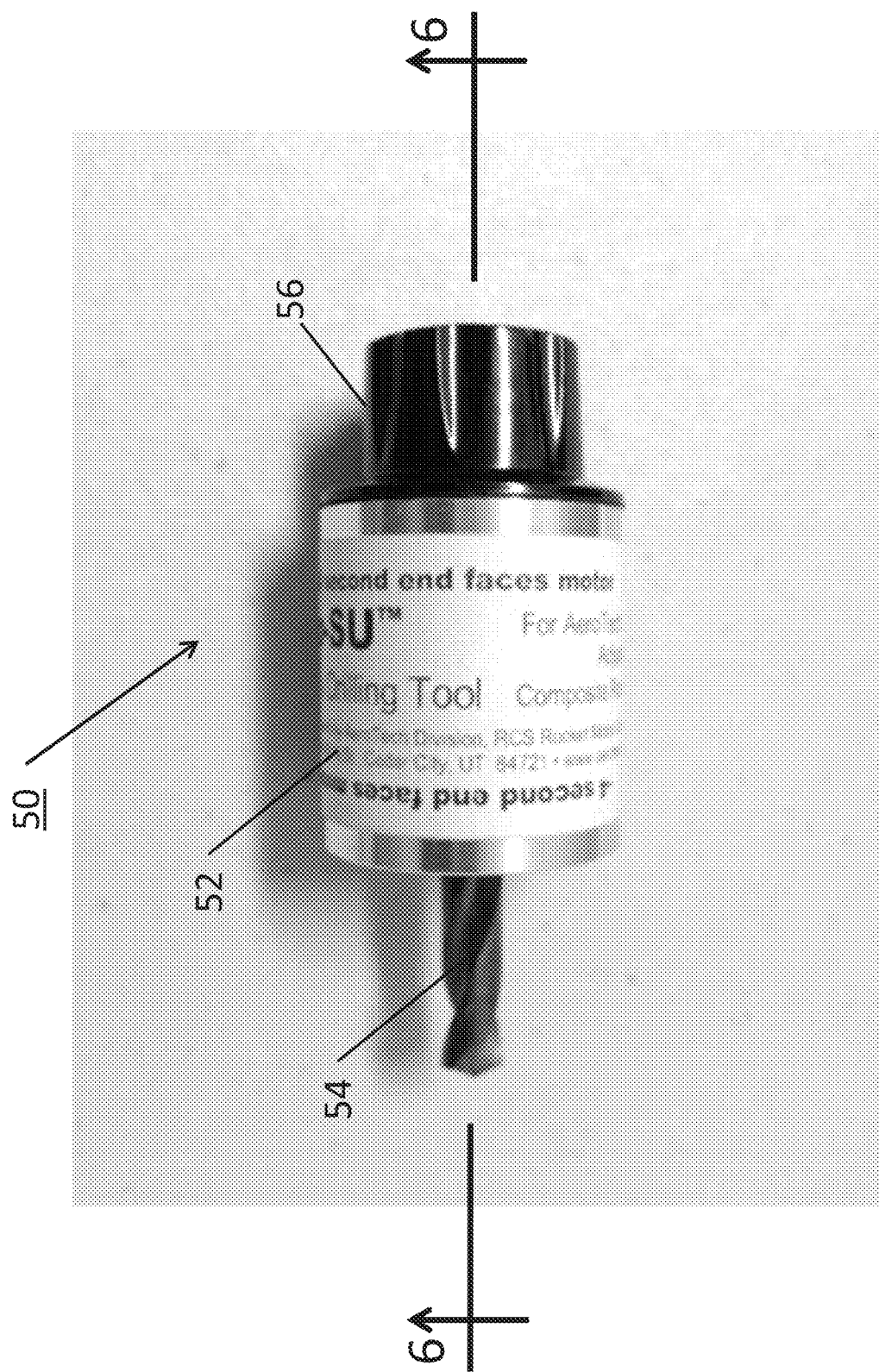
FIG. 5 is an elevational front side view of an exemplar delay tool according hereto.
Figure 6:
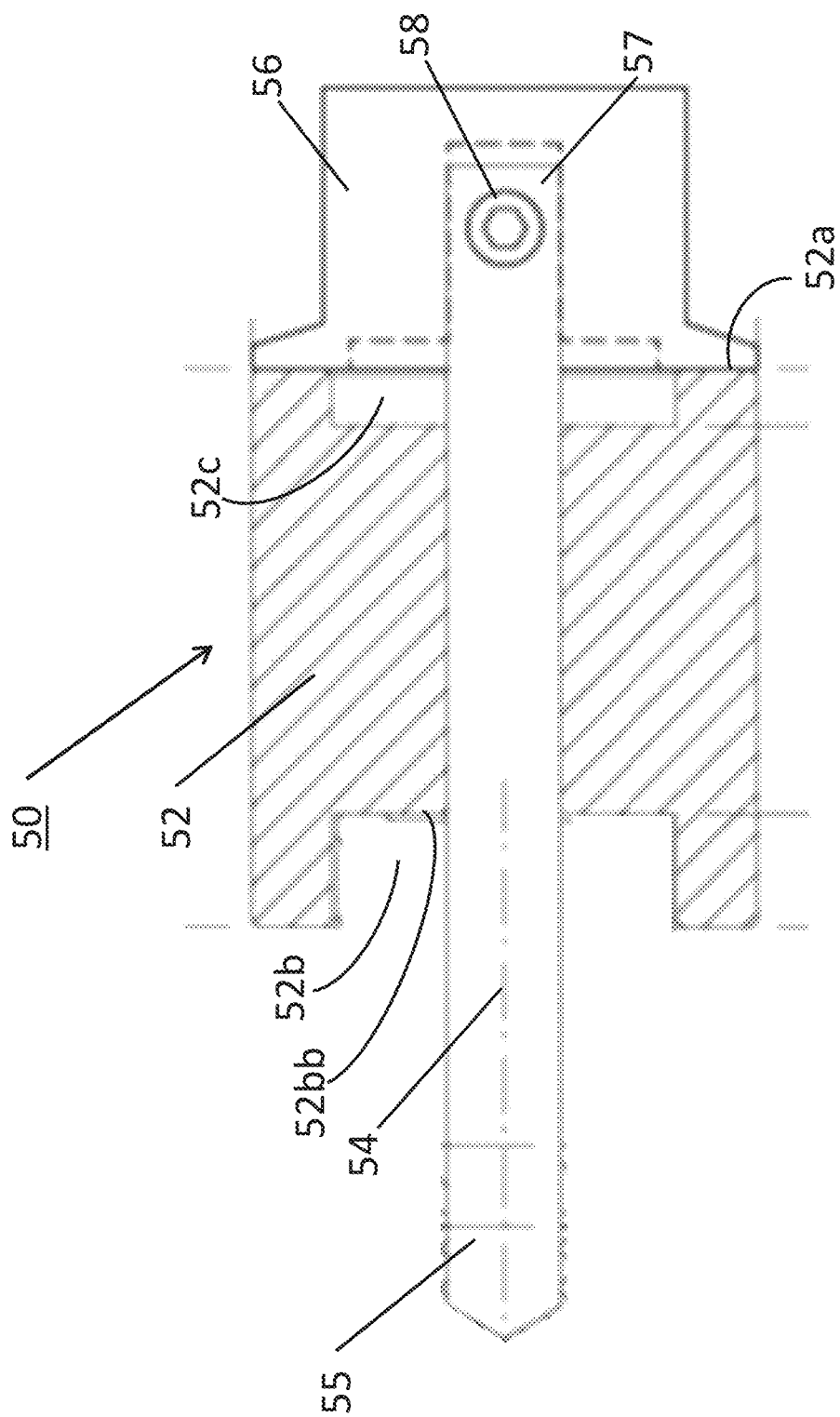
FIG. 6 is a slightly enlarged cross-sectional view of a delay tool as in FIG. 5 taken along line 6-6 thereof.

A delay manipulation device 50 also sometimes referred to herein as a delay drilling tool 50 is shown in FIG. 5 and the cross-section of FIG. 6, may be used herewith/herein. Such a tool or device 50 may include a body structure or frame 52, a drilling bit 54 and a drill knob 56 connected internally to the drilling bit. This knob to bit connection is shown better in FIG. 6 by a bolt or screw 58, though other forms of connection might be used as well or instead. The drill bit 54 has a drilling end portion 55 and a connection end portion 57 as shown in FIG. 6.

Next, for setting or selecting the time delay, it may first be noted that the as-supplied delay element will have a first time delay period associated therewith without manipulation (the material thereof will be disposed to be consumed within a period of time known as the first time delay period), and if the user wants to use the longest (as-supplied) time delay, no further manipulation would be necessary, i.e., the delay drilling tool would not be used and instead the user would proceed to complete the loading process for launch as described in further detail herein. However, to select and set a different time delay using the tools, systems and/or methods hereof, the delay drilling tool 50 will be assembled into a disposition such as that shown in either FIG. 5 or 6, In moving from FIGS. 6 and 7a (delay tool and bulkhead separate), to FIG. 7b (delay tool in contact disposition for operation), the user would then place the open end of body or frame 52 with the drill bit end portion 55 of the tool over the motor bulkhead/forward closure 21 to the position as shown in FIG. 7b; particularly so that the inner transverse surface 52bb of body 52 comes into operational contact with or otherwise adjacent upper surface 21b of bulkhead 21. Next, the user would hold the tool 50 and bulkhead 21 firmly against each other and turn the drill knob 56 several times clockwise until the drill knob 56 sits flush against the drill tool body/frame 52. In so doing, the drill bit digs into the delay 26 to the position of FIG. 7b, and a desired amount of delay material from delay 26 is removed therefrom.

Figure 8:
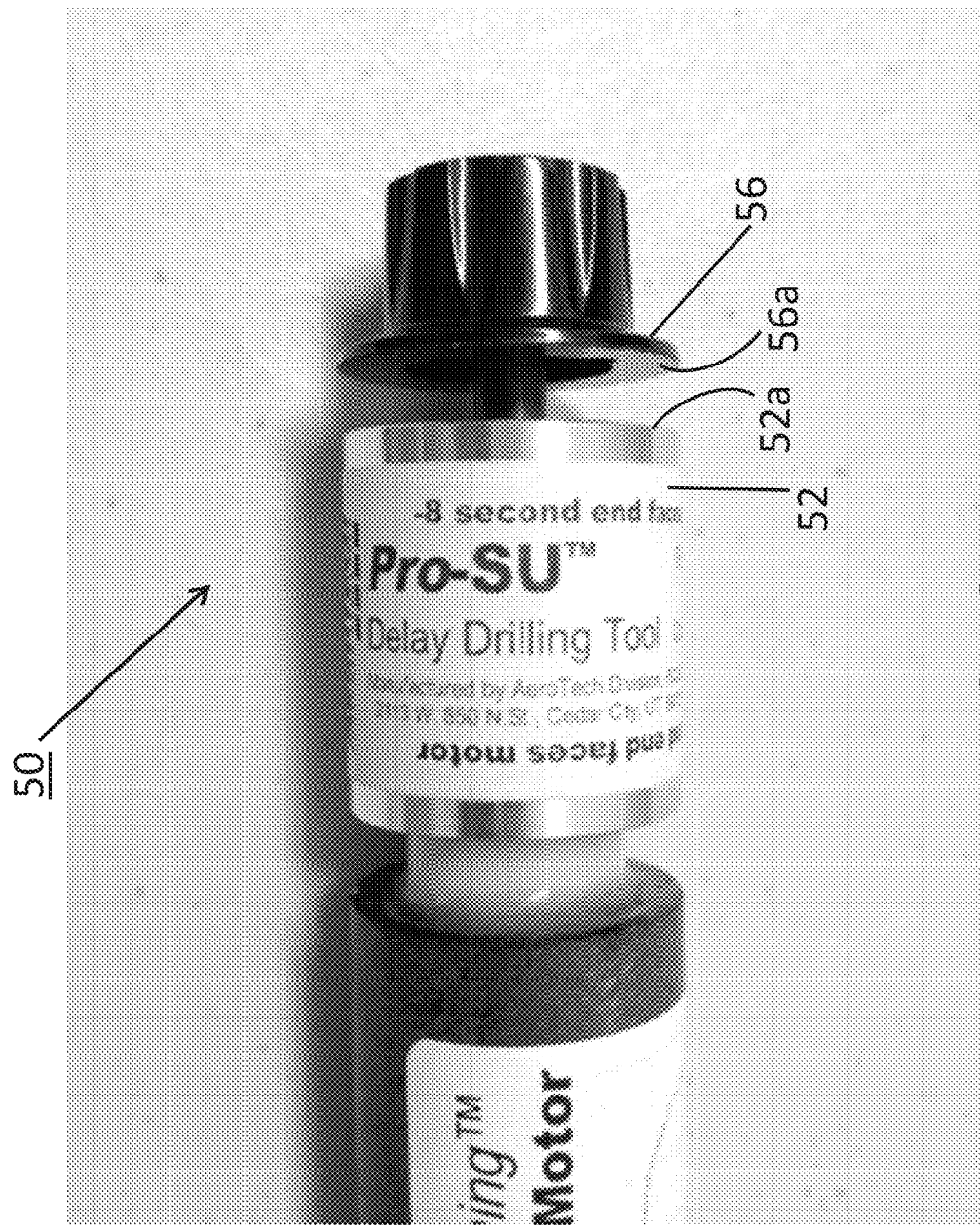
FIG. 8 is an elevational front side view of a delay tool as from FIGS. 5 and 6 in a first operational position relative to a rocket motor delay useable herewith/herein.
Figure 9:
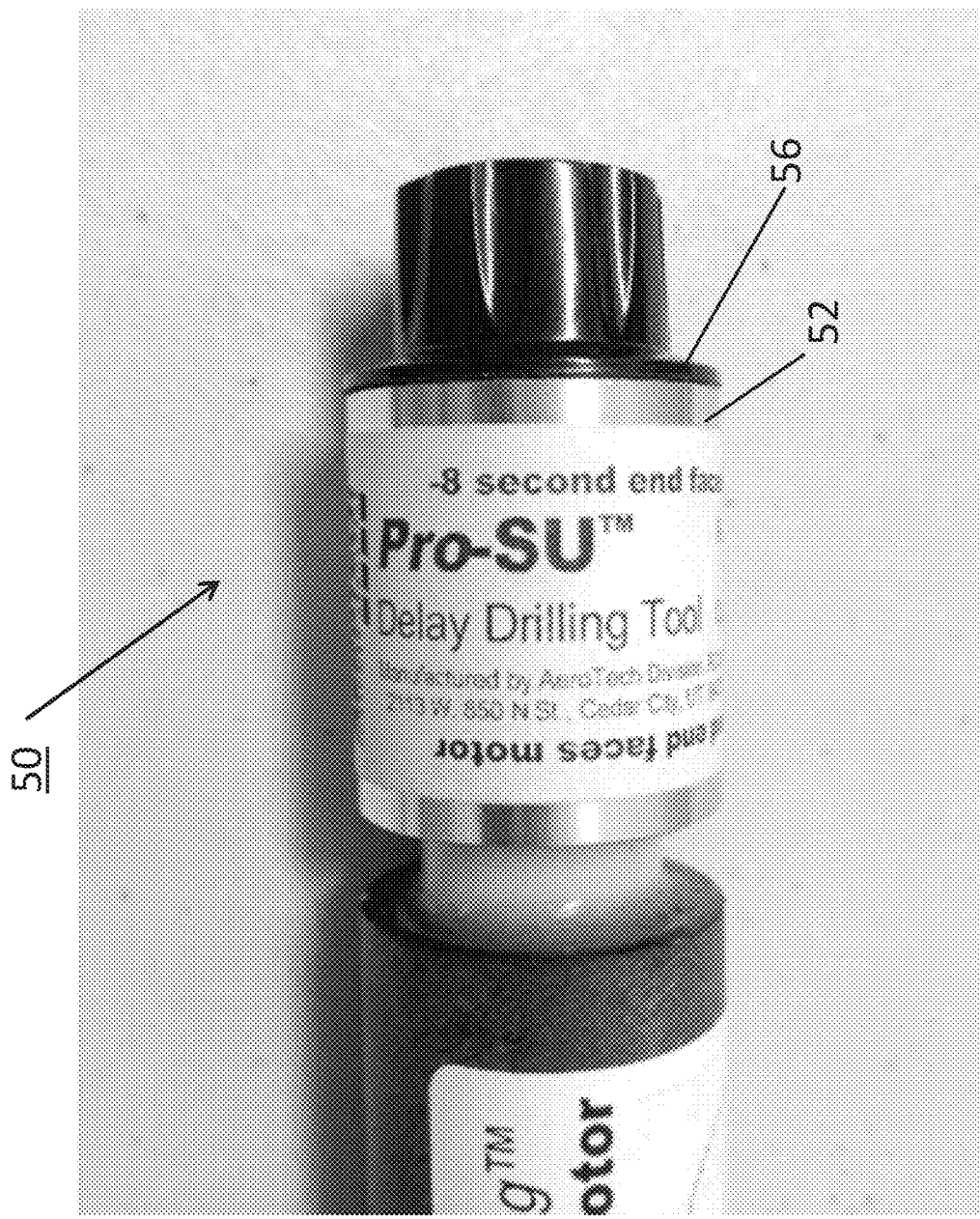
FIG. 9 is a side view of a delay tool as from FIGS. 5, 6 and 8 in a second operational position relative to a rocket motor delay.

Demonstration of this from another set of views, FIG. 8 shows a first position before any drilling or turning of the knob is initiated (see space disposed between knob 56 and frame body 52 defined between opposing surfaces 52a and 56a), and FIG. 9 shows the completed position after drilling (see no space between frame body 52 and knob 56). The position of FIGS. 7b and 9 shows the frame 52 acting as a stop to stop/restrict the ability for any further incursion by the drill bit head 55 into the delay element 26. As shown in FIG. 7b, this operation then results in a drilling into the body of the delay element 26 and effective removal of some of the material thereof. This reduction of material from the body of the delay element 26 will result in a reduced time for burn through of the delay element and thus a reduced delay before the ejection charge is ignited to eject/deploy the recovery system.

To complete the process of use of the delay drilling tool 50, the user will then remove the tool 50 from the bulkhead 21 and thus also from the delay element 26, and then, the user will shake out the shavings from the delay element 26 from the tool and motor bulkhead. Typically, the user will then dispose of the delay shavings by burning the shavings with a safe method and in a safe location.

Figure 10:
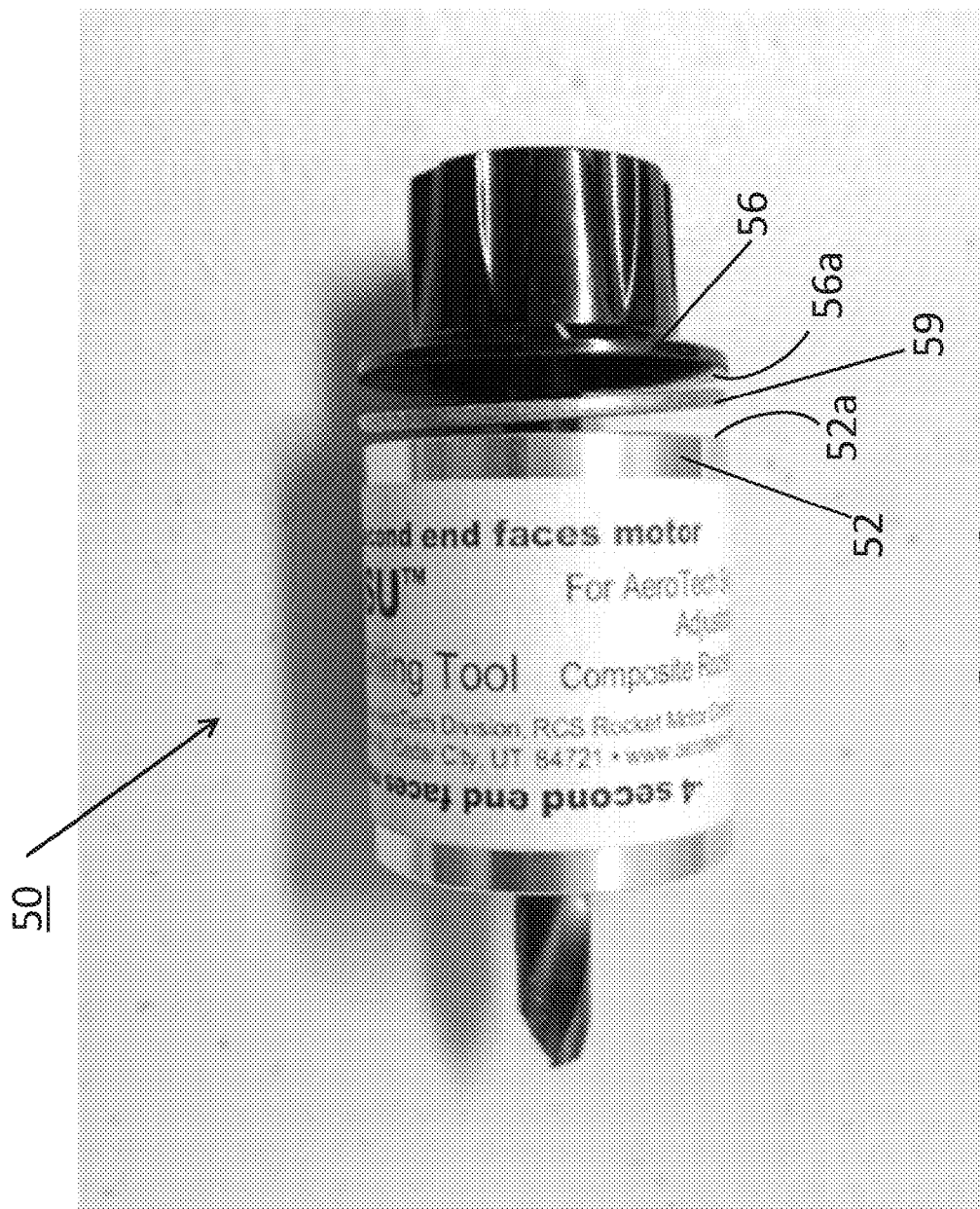
FIG. 10 is a side view of a delay tool as from FIGS. 5, 6, 8 and 9 with an alternative added operational element.

A feature hereof can be included and involve adaptations that allow a user to select different time periods of delay with alternative selections as to the orientation and use of the tool. For a first such example, if a longer period of delay (which can be pre-calibrated by thickness as described hereafter) may be desired, a spacer 59 such as is shown in FIG. 10 may be interposed between the knob 56 and the frame body 52. The spacer 59 would then provide a sooner stop by setting a desired thickness between the upper surface 52a of the frame body 52 and the under surface 56a of the knob 56 so that each of these surfaces come into operable contact with the spacer or washer 59 rather than coming into contact with each other as shown in FIGS. 8 to 9. The result is a selected somewhat less material removed from the delay element 26 and thus a longer burn-through time period and hence a longer delay before ejection charge firing and ejection deployment.

Figure 11:
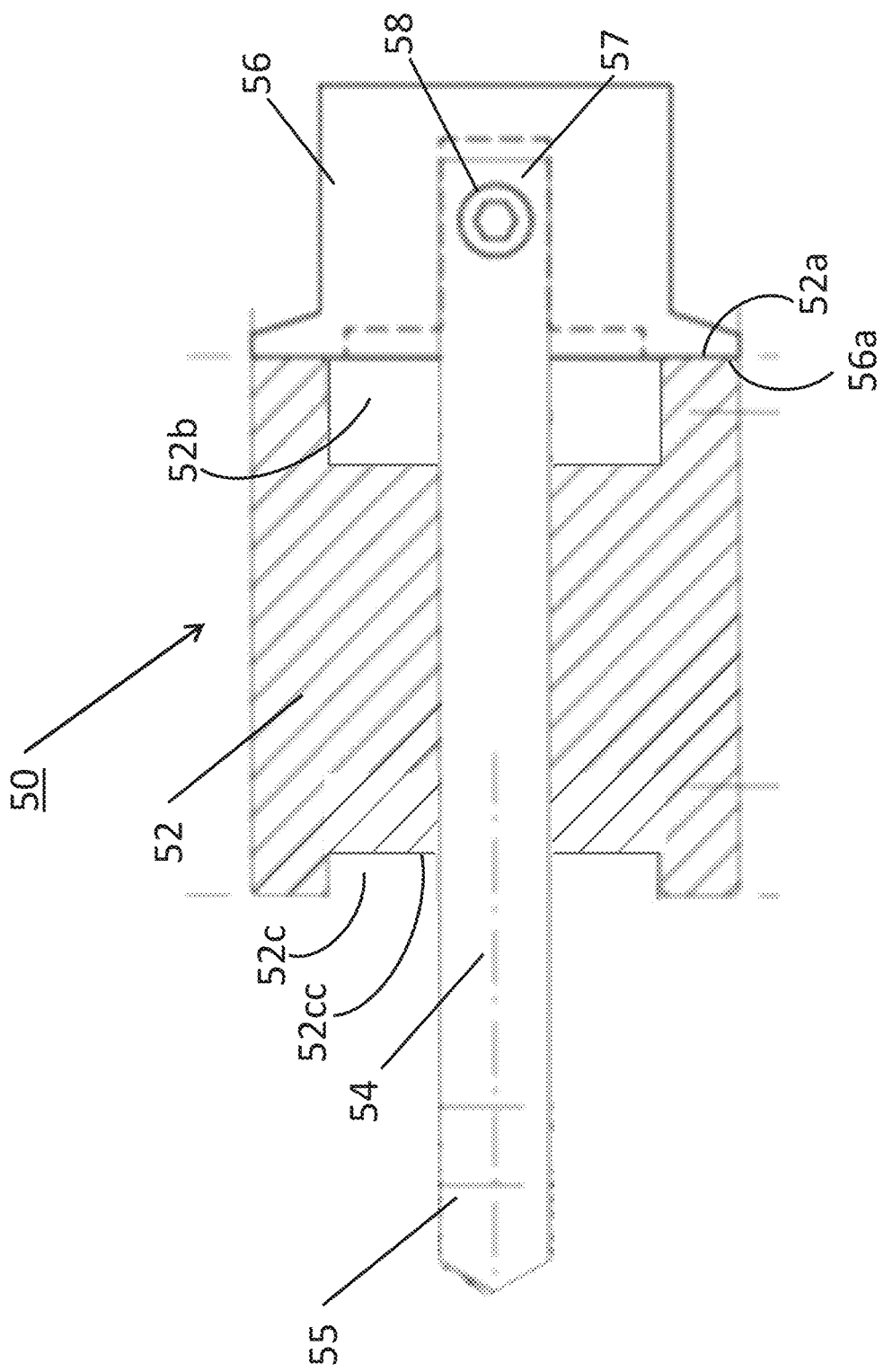
FIG. 11 is a cross-sectional side view of a delay tool as from FIGS. 5 and 6 with a portion thereof flipped into an alternative operational position.

On the other hand, a different delay period might then be selectable using a frame body 52 like that shown in cross section of FIG. 6 and flipped in FIG. 11 relative to the drill bit/knob 54/56 combination, where the shallower well 52c is now disposed at or near the drilling end 55 of the drill bit 54 so that the drill bit 54 may now not be allowed to drill as deep into a delay element 26 when in use. The deeper well 52b is now adjacent the knob 56. Note, the wells 52b and 52c actually engage the top portion of the bulkhead 21 as shown in FIG. 7b (inner transverse surface (either of surfaces 52bb or 52cc, surface 52cc identified in FIG. 11) of body 52 engaging upper bulkhead surface 21b), and thus, this sets whether and how deep the drill bit may drill into the delay material 26. The result is that even less delay material is removed from the delay element and thus, a selection between alternatives of a desired amount of delay time removal can now be effected. Note a spacer like that 59 used in FIG. 10 can also be used with this flipped disposition to effectuate a further different time period of delay.

Thus, with properly chosen dimensions and appreciation of the delay element material being used herewith, a plurality of alternative desired time intervals may be effectuated. In an example like that shown in the FIGS., the frame 52 may provide, for a particular exemplar device 50, either a 4 or an 8 second less delay than the un-drilled delay element would provide—the 4 seconds-less delay corresponding to the shallower well 52c being flipped into position (see FIG. 11) such that it is at the drill bit end 55 and engages bulkhead 21, and the 8 seconds-less delay corresponding to the use of the deeper well 52b at the drill bit end 55 and engaged with bulkhead 21 to remove more delay material from delay element 26. These 4 and 8 seconds-less delay choices might then be marked on the tool label on the face of the tool frame/body 52 for ease in user selection. The spacer/washer 59 (see FIG. 10 disposition between the drill knob and the tool) can then be pre-selected to provide another desired interval of time delay between those provided by the alternate wells 52b/c if the user wants to remove 2 seconds less than the value printed on the tool, i.e., 2 or 6 seconds-less delay period based on corresponding delay material removal—the 2 second delay corresponding to the period achieved if the shallower 4 second well 52c is selected for disposition at and engaged with the bulkhead 21 and the spacer 59 is also used, and the 6 second delay corresponding to the use of the 8 second deeper well 52b and the washer 59.

Note also that the delay material may be drilled out from either the ejection end or the propellant side. For single use, or limited re-use examples, such would be best effected with a foreword closure that may be initially disparate from the rocket motor but assembled therewith after a delay drilling procedure. In other words, a propellant side delay may be drilled using a tool 50, in some implementations before the fore closure has been attached to the rocket motor. In such a case, the fore closure can be contacted by the tool 50 from the propellant side, the tool engaging an appropriate surface of the fore closure, and the drilling operation completed. Then, the fore closure with the selected and modified delay can then be attached to the rocket, either fixed in place as in single-use (sometimes with epoxy or like), or removably disposed therein as in limited re-use or reloadable (see below for more description of reloadable options).

Figure 12:
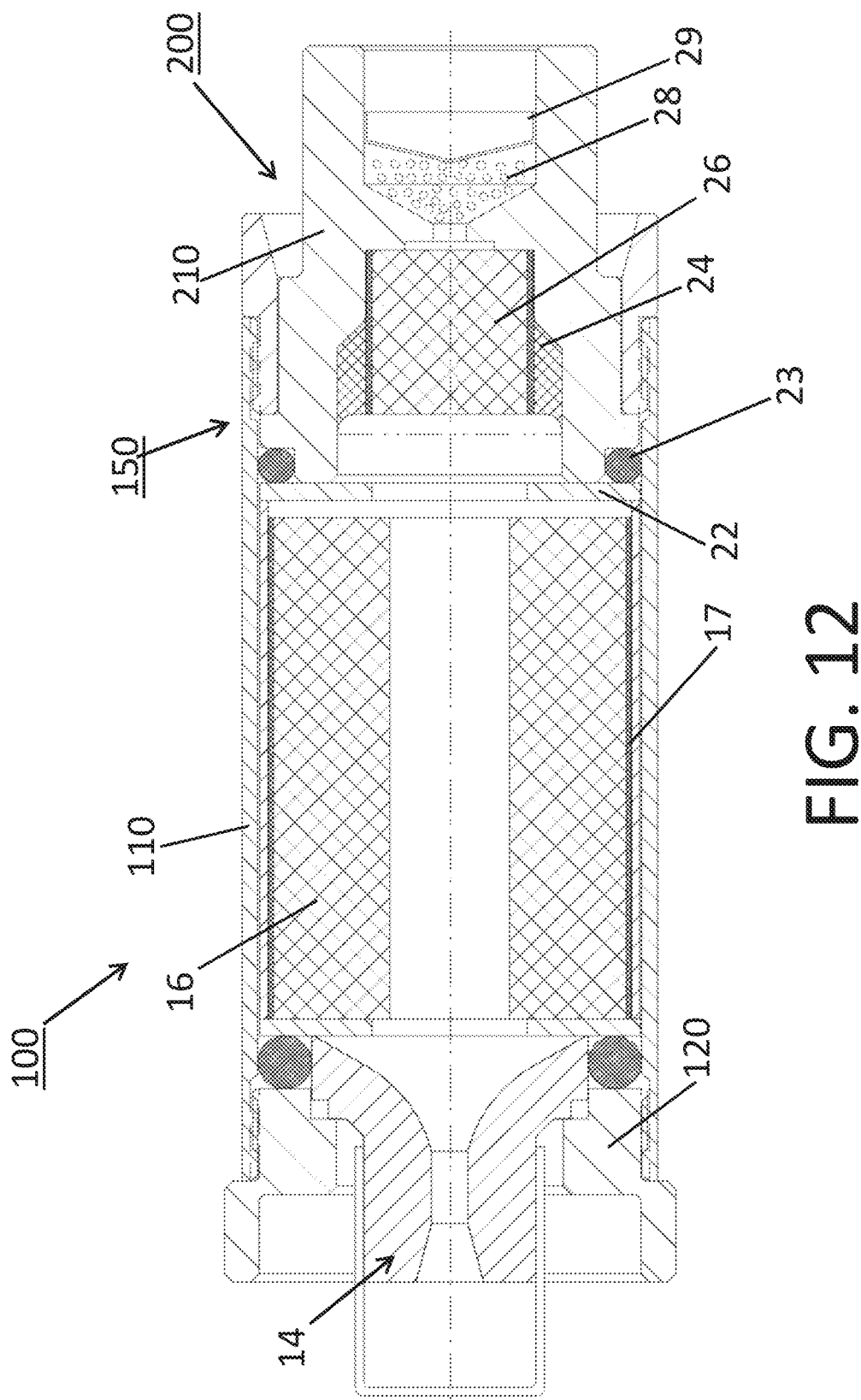
FIG. 12 is a cross-sectional view of a re-loadable alternative rocket motor.

As shown in more detail for example in FIG. 12 is a reloadable implementation 100 with a removably attached/attachable aft closure 120. I.e., the casing 110 in this example has an aft closure 120 affixable thereto but detachably so. Although, as described above, the present developments can also be used with the fixed aft closure type (or even fixed forward closure), described in this sub-section are removable fore and/or aft closure implementations. A nozzle 14 is shown built-into the aft closure 120 (not unlike the built-in nozzle 14 of the fixed closure 12 of the single use/limited re-use example of FIG. 1, above), and thus forms a part of the assembly of the rocket 100 when attached to the casing 110. Note that although the aft closure 120 is shown removably attached to the casing 110 in the drawing examples herein, it may be that the forward closure element 210 is pre- and/or permanently affixed or affixable to the casing 110, however, as shown in this implementation, the forward closure 210 here is also removably attachable with the aft closure 120 to be connected to the casing 110 before or after loading of the interior rocket motor elements, if before, then, the propellant grains, etc. would be loaded from the forward end, if after, then, the grains would be loaded from the aft end.

Continuing with a description of some exemplar elements in FIG. 12, a reload kit 150 may include a propellant grain 16 with a liner (often a long paper tube) 17, and a forward closure assembly 200, which may include a forward closure element 210 (sometimes also/alternatively referred to as a bulkhead), a forward insulator 22 between the propellant and the fore closure, a forward closure o-ring 23 as this may be a typical option for re-use, a delay insulator 24, a delay element 26, an ejection charge 28 with ejection charge retainer cap 29 (typically, the ejection charge may be contained within a discrete storage/transport container (not shown)). Assembly is not unlike that described above for the other implementations, the primary exceptions being that the forward bulkhead and the aft closure will be attached to the rocket motor casing, one or the other before the insertion of the motor fuel and related components. Then, the other of the aft closure and the forward bulkhead would be attached to finish the assembly.

Figure 13A:
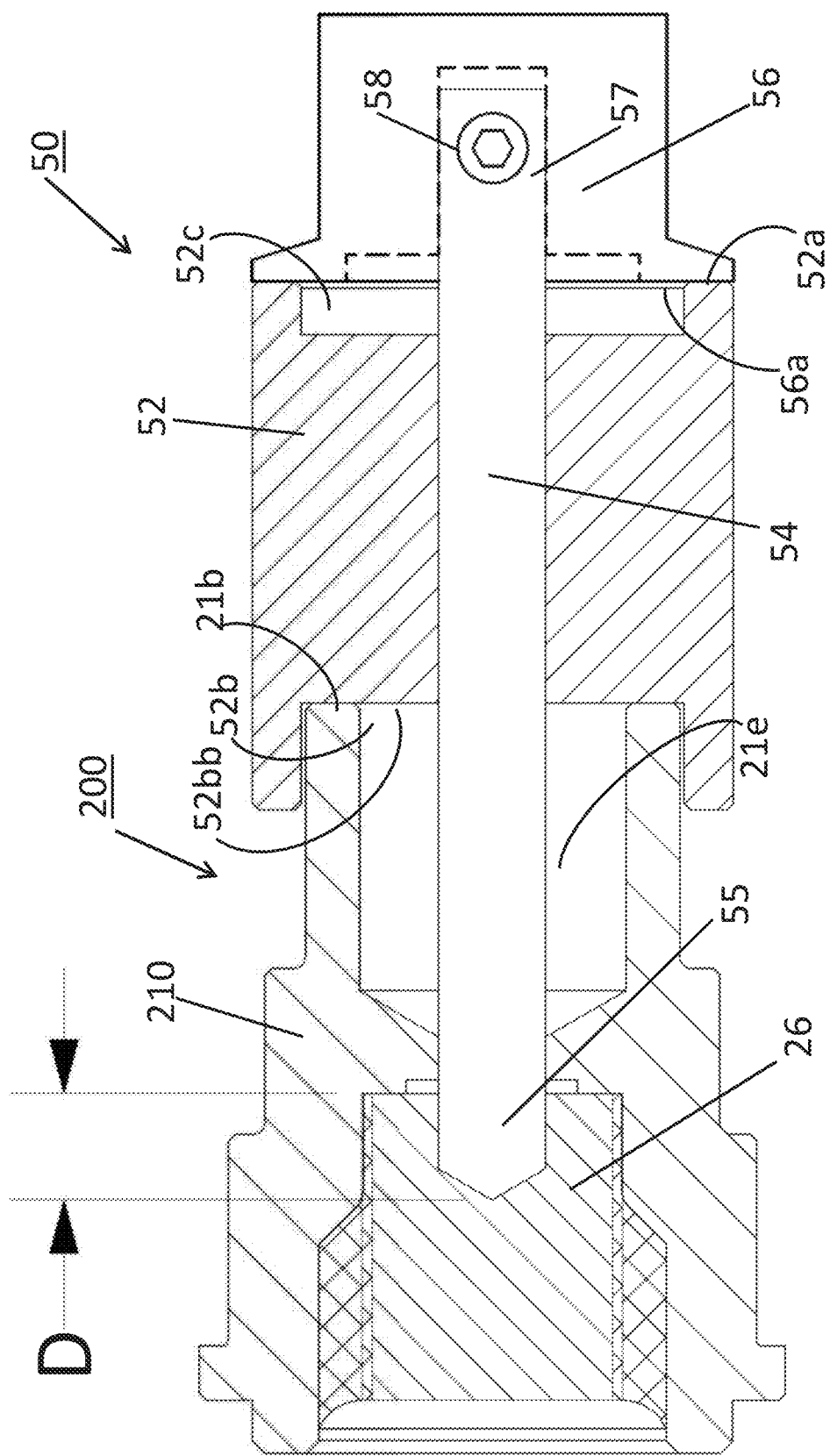
FIG. 13, which includes and is defined by sub-part FIGS. 13a and 13b, provides cross-sectional views of re-loadable alternative rocket motors and drill delay tools in alternative operative dispositions relative thereto.

However, for an adjustment to the delay, it may be that a drilling procedure is conducted or conductible before or after the forward closure is attached to the casing, and/or it may be that the drilling operation may be completed from either end of the forward closure, whether the ejection end or the propellant end; implementations of each being described here with reference to FIG. 13. In the first option described relative to FIG. 13*a*, the delay is manipulated as was shown for the single use (limited re-use) example(s) above through the ejection well and thus, may take place before or after the disposition of the fore closure on or in the casing 110; however, in an alternative operation with a reloadable system wherein a delay adjustment is performed before the forward bulkhead is attached to the rocket motor casing will also be described below.

First, for FIG. 13*a*, a delay tool 50 is shown as operatively disposed relative to a forward closure, as for example here, a fore closure 210, here operatively engaging the delay material 26 through the ejection well 21*e*. Not unlike the examples described above, a tool 50 having a body 52 and a drill bit 54 with a drill end 55 engaging the material 26 is disposed such that the inner transverse surface 52*bb* is engaged with bulkhead upper surface 21*b*. Then, knob 56 is operated to turn the drill and remove material from the delay charge 26 to a depth D, to reduce the delay period before the ejection charge would be ignited to deliver the payload (not shown). Note, the timing of the delay manipulation (e.g., the reduction by number of seconds) may be accomplished here also like that done for and as shown in and described relative to FIGS. 8-11 (e.g., flipping the body 52 and/or using a spacer 59), the description thereof from above incorporated herein as if fully set forth here. As such a "universal" tool for delay manipulation may thus be achieved for use with either or both of single use and/or reloadable motor systems (and limited re-use systems).

Figure 13B:
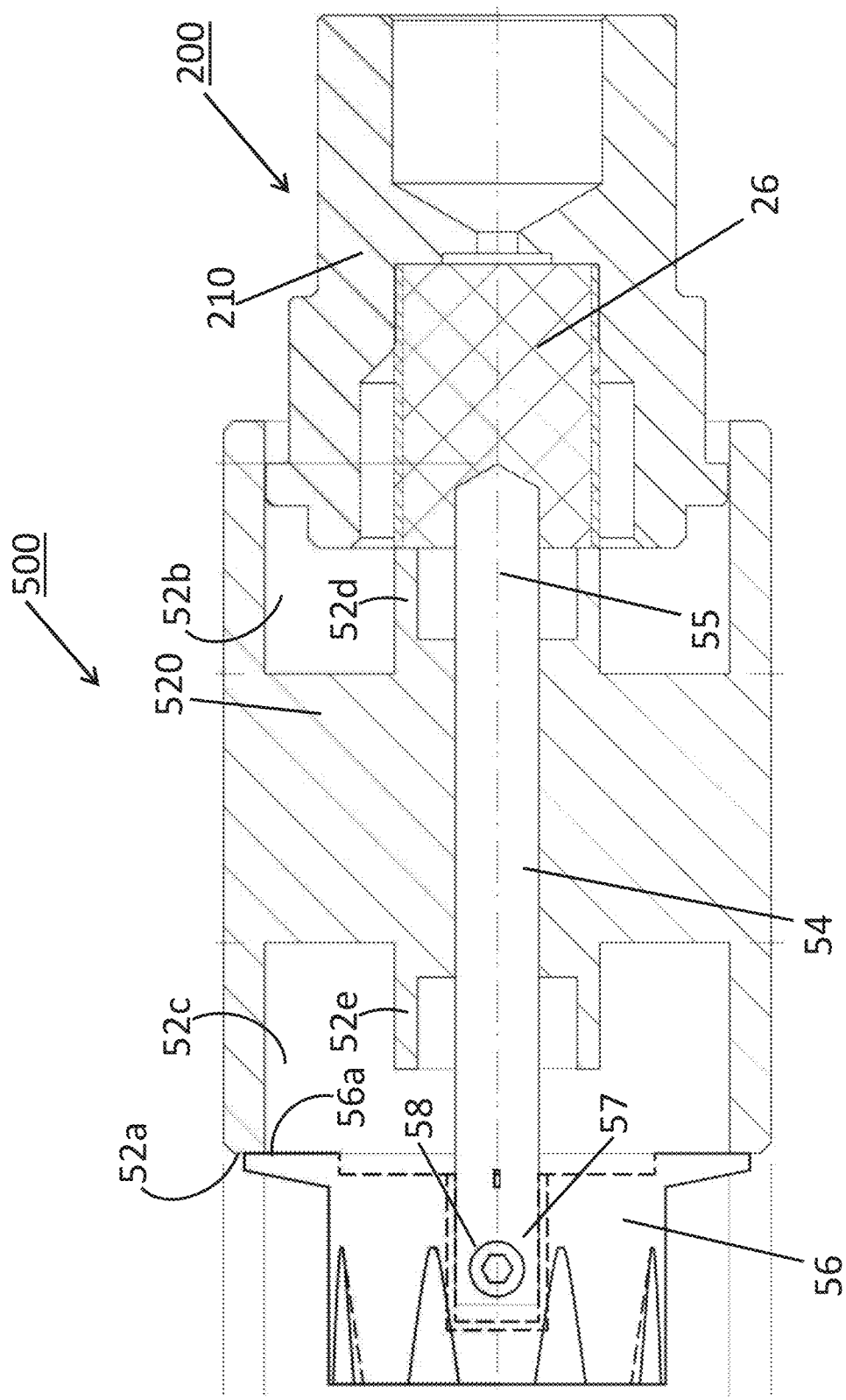

Moreover, in a slightly differing alternative as shown in FIG. 13*b*, the delay charge may be engaged not through the ejection well 21*e*, but rather from the aft end using a tool 500. Accordingly, an adjustable delay and ejection charge rocket motor assembly and operation instructions will now be described. A delay manipulation device 500 also sometimes referred to herein as a delay drilling tool 500 is shown in FIG. 13*b*, and includes a frame 520, a drilling bit 54 and a drill knob 56 connected to the drilling bit. This knob to bit connection is shown in FIG. 13 by a screw 58, though other forms of connection might be used as well or instead. The drill bit 54 has drilling end portion 55 and a connection end portion 57 as shown in FIG. 13.

Next, as was the case for the earlier described implementation, for setting or selecting the time delay, it may first be noted that the as-supplied delay element will have a first time delay period associated therewith without manipulation, and if the user wants to use the longest (as-supplied) time delay, no further manipulation would be necessary, i.e., the delay drilling tool would not be used and instead the user would proceed to complete the loading process for launch as described above and in further detail below. However, to select and set a different time delay using the tool and method hereof, the delay drilling tool will be assembled into a disposition such as that shown in either FIG. 13. The user would then place the open end of frame 520 with the drill bit end portion 55 of the tool in the delay side (aka propellant side) of motor bulkhead/forward closure 210 as shown in FIG. 13*b*. As shown here, the delay side of the motor bulkhead/forward closure is being accessed, though as introduced above, an implementation may instead be used to access the delay charge from the other side, the ejection well side of the bulkhead. Next, the user would hold the tool 500 and bulkhead 210 firmly against each other and turn the drill knob 56 several times clockwise until the drill knob 56 sits flush against the drill tool body/frame 520. FIG. 13*b* shows an end position after drilling or turning of the knob has been completed. Note, a preliminary position would not be unlike that shown for the prior implementation; see FIG. 8, spaced before drilling is initiated (see space disposed between knob 56 and frame body 52 in FIG. 8, and the similar after position in FIG. 9 showing the completed position after drilling; see no space between frame body 52 and knob 56 in FIG. 9). The position of FIG. 13*b* shows the frame 520 acting as a stop to stop/restrict the ability for any further incursion by the drill bit head 55 into the delay element 26. As shown in FIG. 13*b*, this operation then results in a drilling into the body of the delay element 26 and effective removal of some of the material thereof. This reduction of material from the body of the delay element 26 will result in a reduced time for burn through of the delay element and thus a reduced delay before the ejection charge is ignited to eject/deploy the recovery system.

In some discrete implementations, such as that shown in FIG. 13b, internal structures, such as internal cylindrical structures 52d and 52e within the respective wells 52b and 52c might be used for establishing the preferred seat of the tool 500 against the bulkhead 210, here as seated adjacent the delay element and/or the delay well structure of the bulkhead. Alternative seating structures like this are not intended to be limiting, merely illustrative of alternative structures of the frame 52 or 520 to set the tool in a desired position to drill out a desired quantity of delay material to achieve the modified delay period.

To complete the process of use of the delay drilling tool 500 of FIG. 13b, the user will then remove the tool 500 from the bulkhead 210 and thus also the delay element 26, and then, the user will shake out the shavings from the delay element 26 from the tool and motor bulkhead. Typically, the user will then dispose of the shavings by burning with a safe method and in a safe location.

As was the case above, an alternative feature hereof may also involve adaptations that allow a selection of different time periods of delay with alternative selections as to the use of the tool. For a first such example, if a longer period of delay (which can be pre-calibrated by thickness as described hereafter) may be desired, a spacer 59 such as is shown in FIG. 10 may be interposed between the knob 56 and the frame body 520 of the tool 500 of FIG. 13b (spacer 59 not shown in FIG. 13). The spacer 59 would then provide a desired thickness between the upper surface 52a of the frame body 520 and the under surface 56a of the knob 56 so that each of these surfaces come into operable contact with the spacer or washer 59 (spacer 59 not shown in FIG. 13) rather than coming into contact with each other as shown in FIG. 13b. The result is a selected somewhat less material removed from the delay element 26 and thus a longer burn-through time period and hence a longer delay before ejection charge firing and ejection deployment.

On the other hand, a longer delay period might then be selectable using a frame body like that shown in cross section of FIG. 13 and flipped as was the prior implementation flipped in FIG. 11 where the shallower well 52c would then be disposed at or near the drilling end 55 of the drill bit 54 so that the drill bit 54 may then not be allowed to drill as deep into a delay element 26 when in use. The deeper well 52b would then be adjacent the knob 56. Note, the wells 52b and 52c actually engage the interior delay portion of the bulkhead 210 as shown in FIG. 13, and thus, this sets whether and how deep the drill bit may drill into the delay material 26. The result is that even less delay material is removed from the delay element and thus, the desired amount of delay time removal can now be effected. Note a spacer like that 59 used in FIG. 10 could also be used with this flipped disposition to effectuate a further different time period of delay. With properly chosen dimensions and appreciation of the delay element material being used herewith, desired time intervals may be effectuated. In an example like that shown in the FIGS., the frame 520 may provide, for a particular example, a 4 or an 8 second less delay than the un-drilled delay element would provide—the 4 second delay corresponding to the shallower well 52c being flipped into position (see FIG. 11) such that it is at the drill bit end 55 and engages bulkhead 210, and the 8 second delay corresponding to the use of the deeper well 52b at the drill bit end 55 and engaged with bulkhead 210 to remove more delay material from delay element 26. These 4 and 8 second delay choices might then be marked on the tool label on the face of the tool frame/body 520 for ease in user selection. The spacer/washer 59 (see FIG. 10 disposition between the drill knob and the tool) can then be pre-selected to provide another desired interval of time delay between those provided by the alternate wells 52b/c if the user wants to remove 2 seconds less than the value printed on the tool, i.e., 2 or 6 seconds delay period based on corresponding delay material removal—the 2 second delay corresponding to the period achieved if the shallower 4 second well 52c is selected for disposition at and engaged with the bulkhead 210 and the spacer 59 is also used, and the 6 second delay corresponding to the use of the 8 second deeper well 52b and the washer 59.

Figure 20:
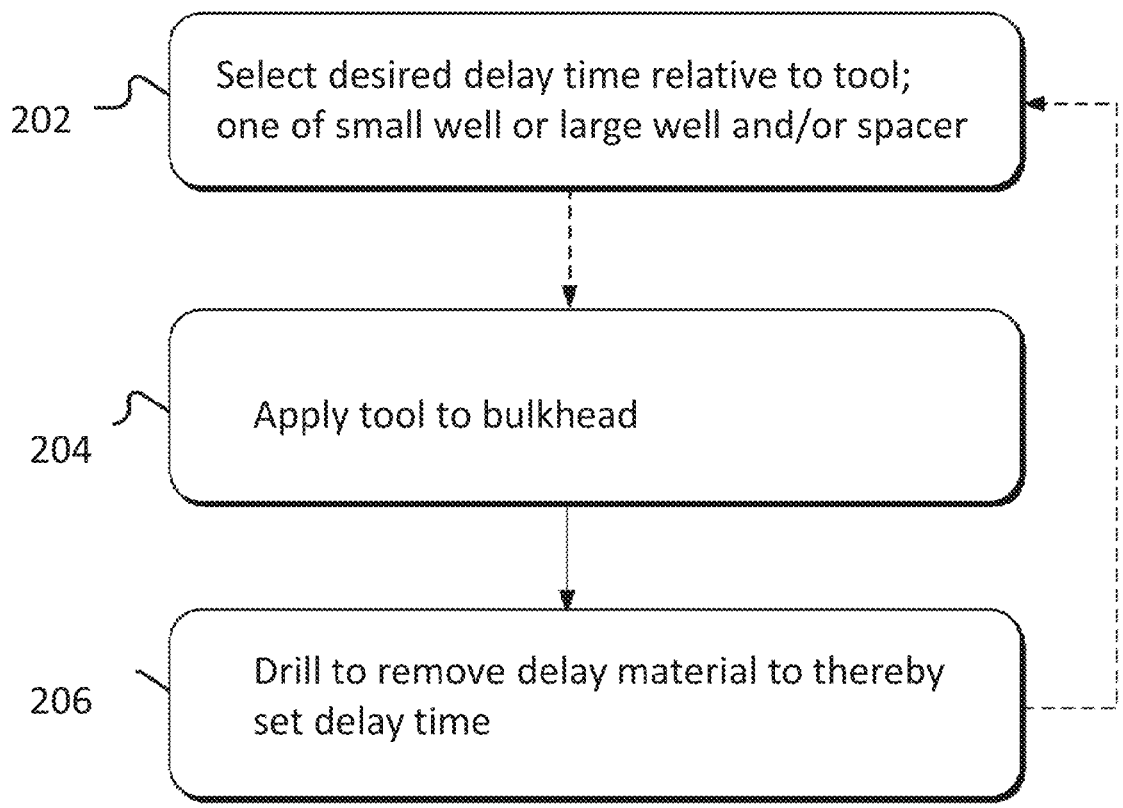

A summary methodology is shown in FIG. 20 where a first operation 202 includes selecting the desired delay time relative to the tool; whether using a delay spacer, or one or the other of a larger or smaller well; then, the operation 203 of applying the tool to the bulkhead, and particularly with putting the drill bit into contact with the delay charge in the bulkhead, and finally, in operation 206, the user drills to remove the delay material and thus modify, and set the delay time.

Note, the systems, apparatuses and methods hereof are usable with any size motor, i.e., not just high power larger motors, but rather also with smaller motors such as G motors or single use G motors. Indeed there is no intent to limit these developments to any particular motor implementations. However, some implementations may have some dependence on the type of delay material for control of burn rate relative to material removed and geometry of removed material; i.e., 1) it may be found desirable to employ a delay material that burns flat, i.e., a pre-understood appreciation for the burn rate of the delay material relative to amount and geometry and volume may be preferred for most implementations and so also may want consideration of tube material and sizing for appreciation of controlled burning of delay material relative to time and amount of material burned 2) also may want consideration of how the delay is sealed in bulkhead—some alternative dispositions and sealing materials may create different burn rates and, 3) may also want understanding and/or control of motor pressure to ensure controlled burn rate for the delay relative to the quantity existent versus removed.

Figure 14:
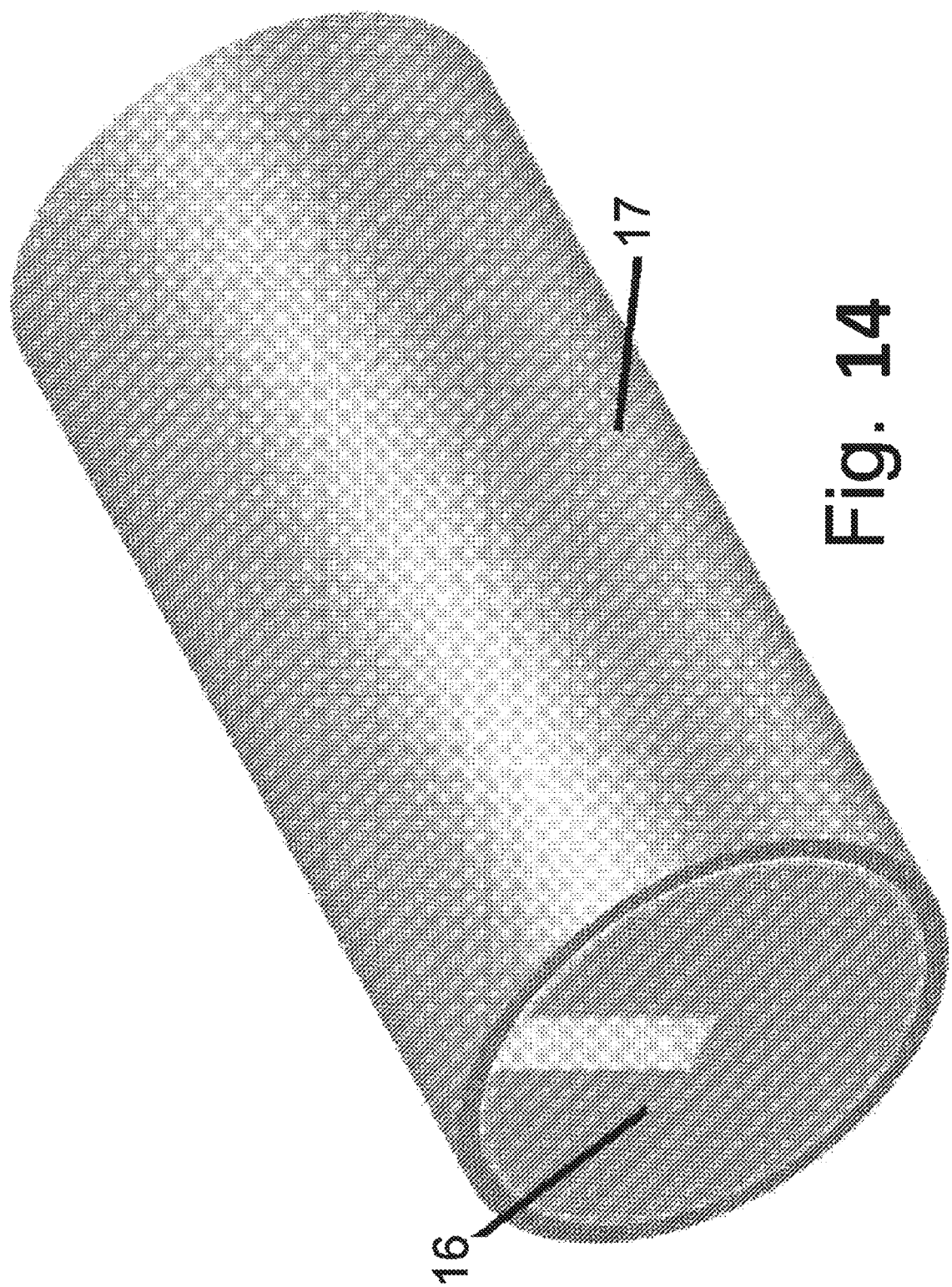
FIG. 14 is an isometric view of a propellant grain assembly of a rocket motor usable herewith.
Figure 15:
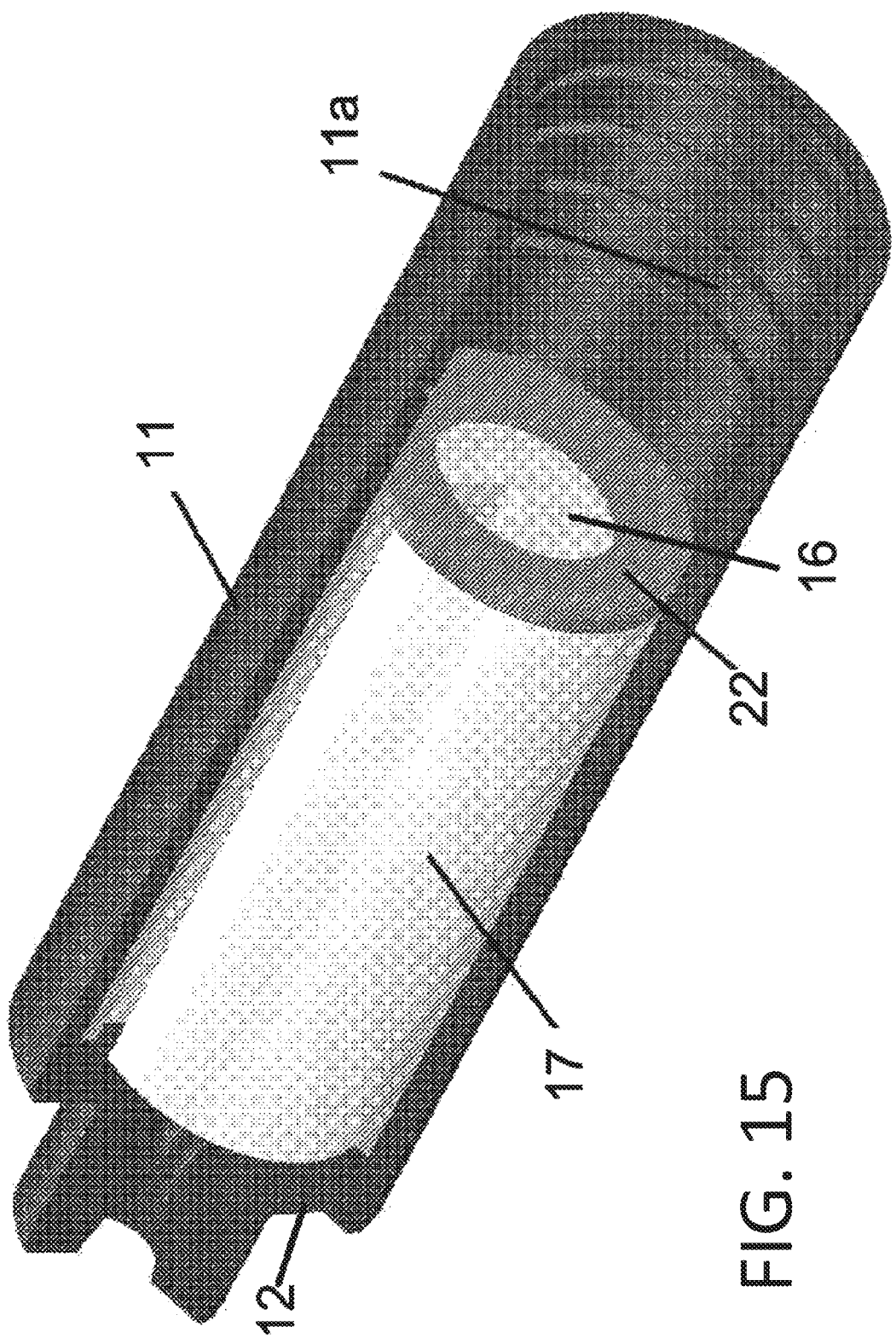
FIG. 15 is a partially sectional isometric view of a rocket motor casing with a propellant grain disposed therein.
Figure 16:
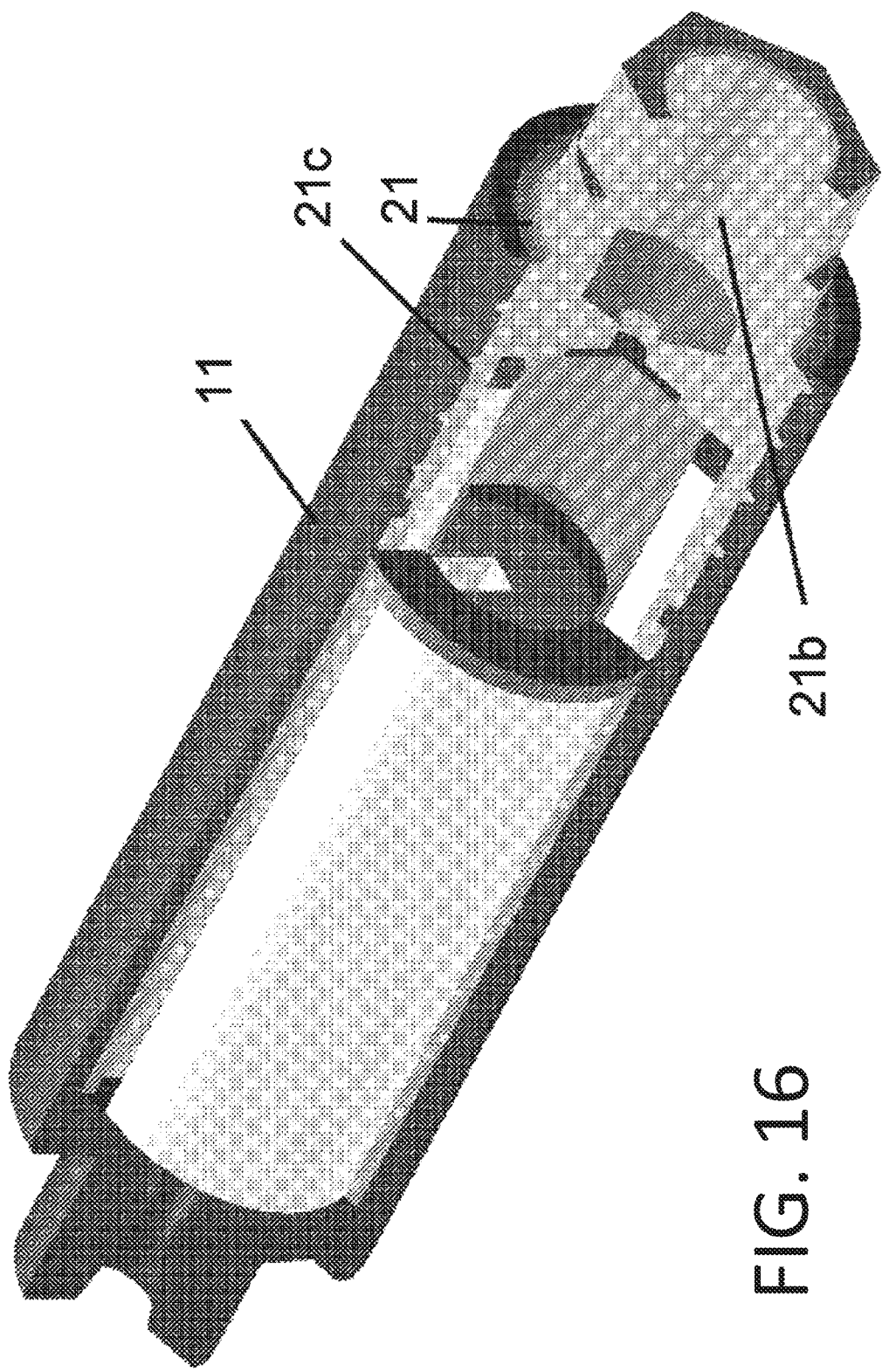
FIG. 16 is a partially sectional isometric view of a rocket motor hereof including a rocket motor casing with a propellant grain and a forward closure assembly with an ejection delay assembly disposed therein.
Figure 17:
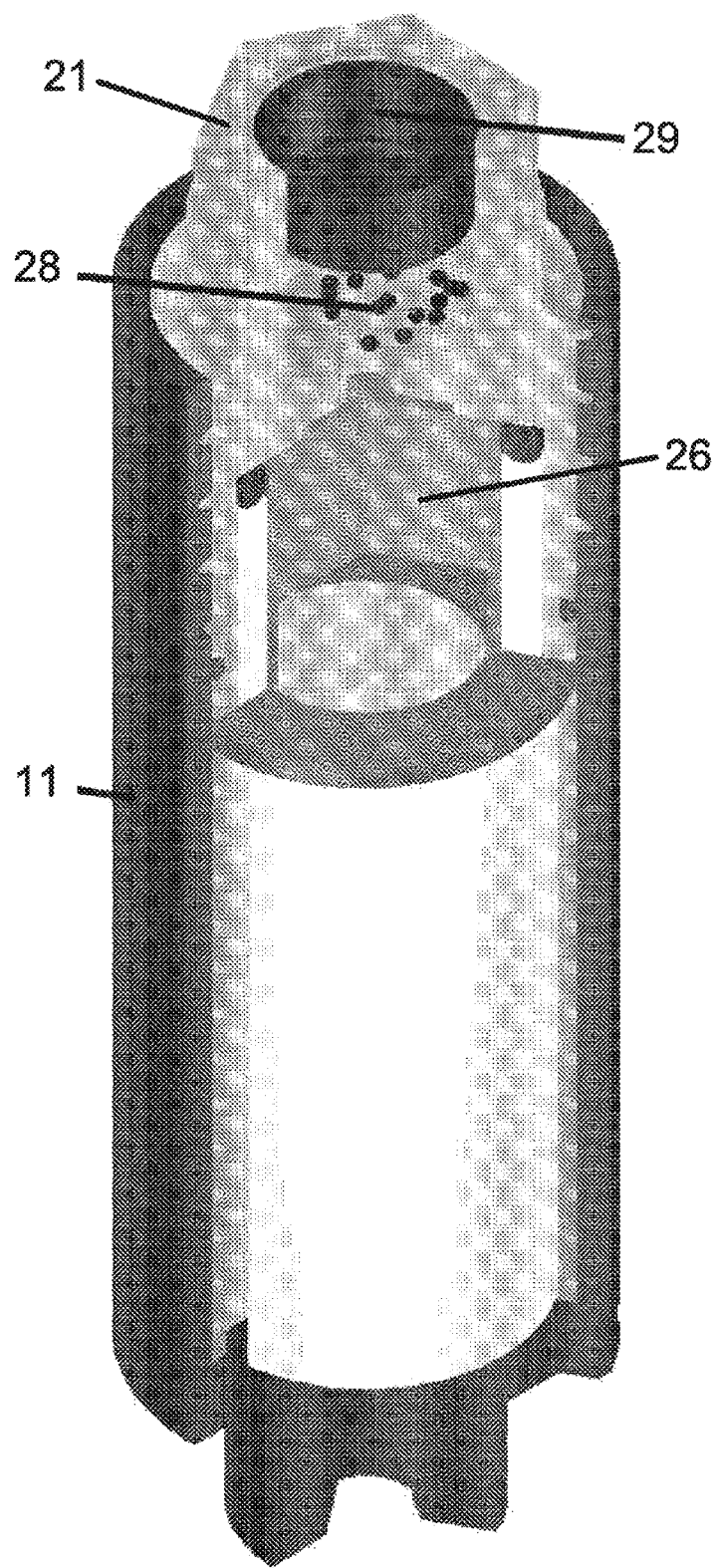
FIG. 17 is a partially sectional isometric view of a rocket motor like that of FIGS. 1 and/or 16 with an ejection charge included and an ejection charge cap in place.

Then to complete the assembly of a rocket example herein, in a further set of operations, case assembly may further include the following. As shown in FIG. 14, an exemplar propellant grain 16 may be installed into the liner 17 (before or after the liner 17 is inserted in the motor casing 11). As shown in FIG. 15, the liner assembly, propellant 16 and liner 17 is disposed/inserted in the motor casing 11 until it is seated against the nozzle end of the case, e.g., at aft closure 12. Also shown in FIG. 15 is the forward insulator 22 installed into the motor casing 11 until it is seated against the liner/propellant combination. A forward cavity 11a of casing 11 is then left for the forward closure element 21. Then, as shown in FIG. 16, the forward closure element 21 is inserted in the casing 11. Note, this may be either an epoxy finish, or this may be a threaded area 21c as well for ease of insertion and locking of the forward closure assembly therein whether in single use or re-usable form. Then, the previously assembled forward closure assembly 20 may then be threaded into the open end 11a of the motor casing 11 until it is seated against the forward insulator 22 or, if in single use form, then, additional epoxy may be applied during and after insertion of closure assembly 20 in the casing 11. The completed assembly may then be set for insertion of the ejection charge as described below.

Then, in a further set of operations, particularly if an ejection charge is to be used, the ejection charge installation may include the following. An ejection charge is obtained, usually a black powder charge which may come in a special container therefor. The ejection charge 28 (see FIG. 17) is then dispensed into the ejection charge well 21*b* (see FIG. 16) of the forward closure bulkhead 21. The ejection charge cap 29 may then be pressed into the ejection charge well (see FIGS. 1 and 17). An aft thrust ring 19 (see FIG. 1) may be bonded to the nozzle end of the case 11, e.g., at aft closure 12. Aft thrust ring 19 may interact with a rocket body (not shown) to carry the rocket body. Ring 19 may be affixed before or after the insertion of the loadable/re-loadable kit elements.

Figure 18:
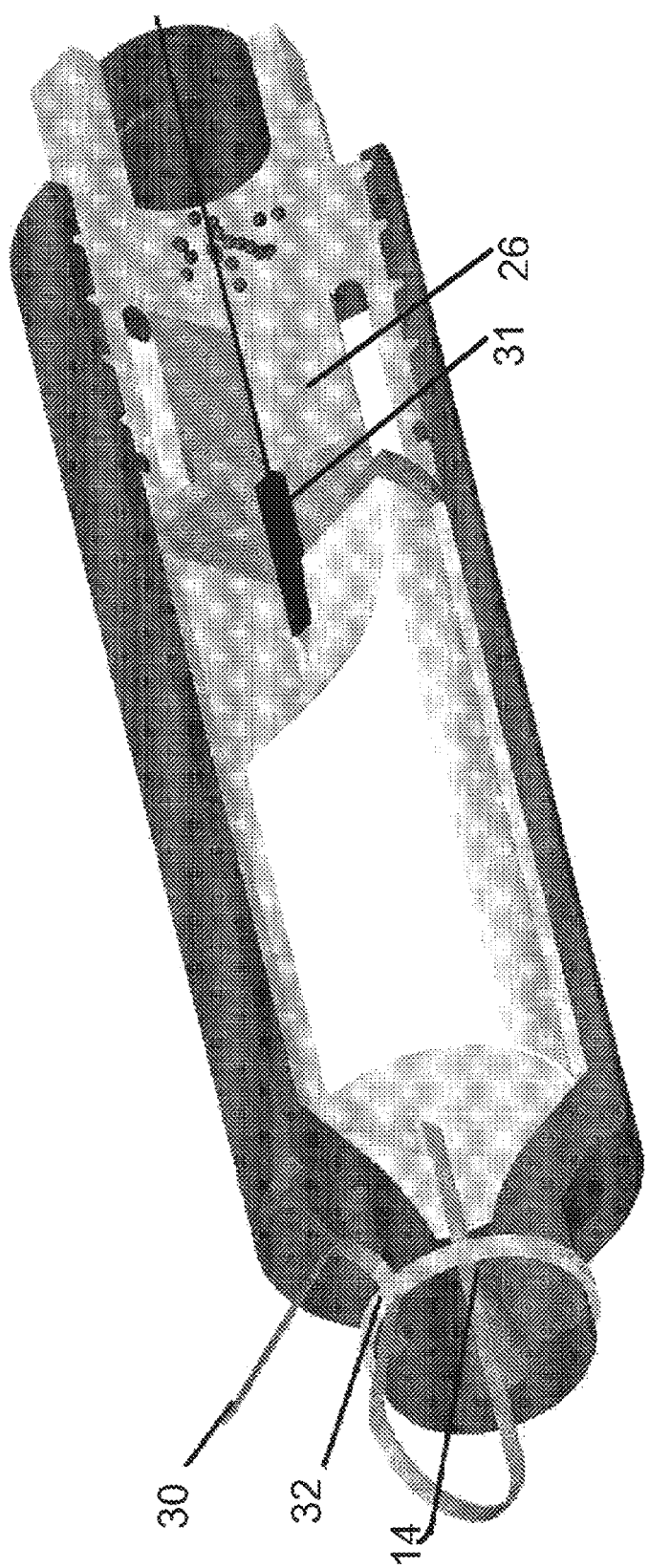
FIG. 18 is a partially sectional isometric view of a rocket motor like that of FIGS. 1 and/or 16 and/or 17 with an igniter installed; and, FIGS. 19 and 20 provide flow charts of use according hereto.
Figure 19:
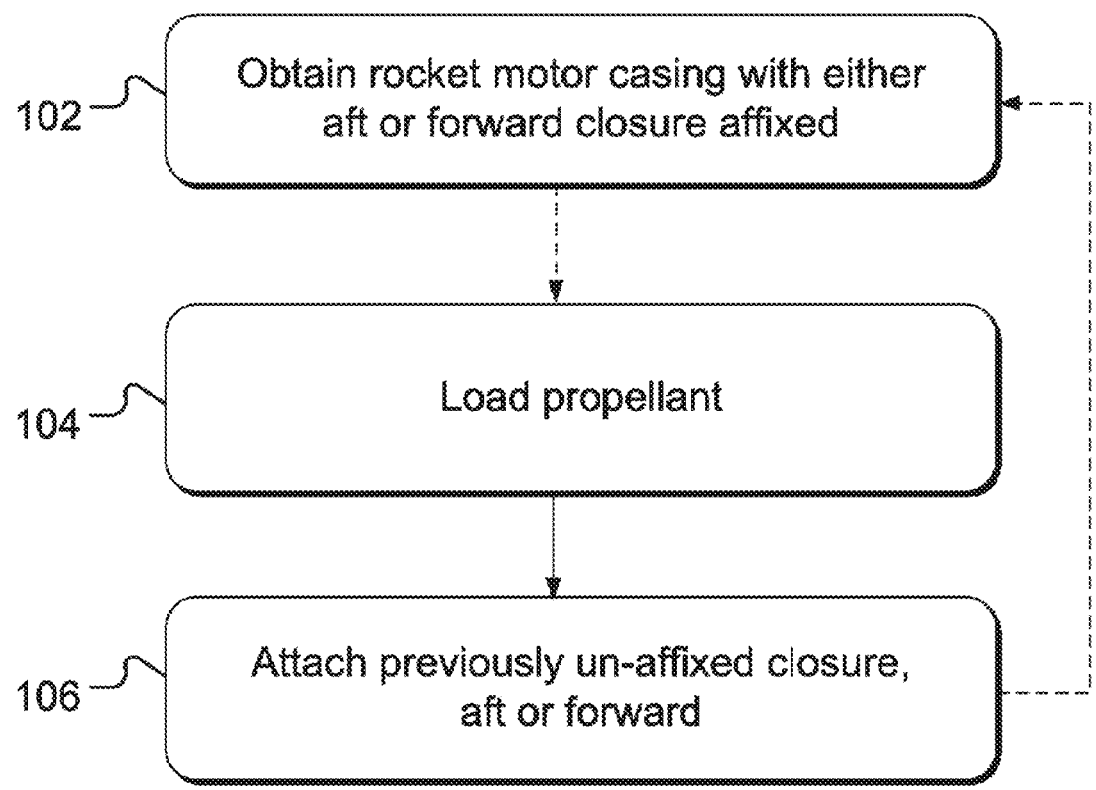

As shown in FIG. 18, the coated end 31 of an igniter 30 (e.g., a FirstFire™ igniter from RCS Rocket Motor Components, Cedar City Utah) may be inserted through the nozzle throat 14 until it stops against the delay element 26. The aft exposed end of the igniter 30 may be engaged by a rubberband igniter holder 32 (or other holder, e.g., tape, glue or the like, particularly if in single-use form). In use, particularly first in assembly, a few operations generally may be summarized as shown for example in FIG. 19. One implementation of an assembly method 100 may include first obtaining or otherwise starting with a rocket motor casing with either an aft or forward closure affixed thereto. This is indicated as operation 102 in FIG. 19. Often, the pre-affixation may be at a manufacturer location, though it need not be. Then, an operation 104 may include loading the propellant into the casing. (A dashed line arrow between operations 102 and 104 indicates that these steps may be pre-performed, as at a manufacturer factory, and may not necessarily occur in the order shown.) Note further that the pre-formation and/or packaging of rocket motor elements can include establishing a predetermined amount of propellant which might aid packaging for transportation in commerce under federal regulations (e.g. DOT regulations). A follow-on operation 106 may then include attaching a previously un-affixed closure, either the aft or forward closure, whichever was not priorly affixed to the casing. The rocket may then be ready to fly. Note, additional operations may occur as well, as for example, if an ejection delay is desired, wherein it would be loaded into the casing as well prior to final assembly of the rocket. Note also that a dashed line is shown connecting operation 106 back to operation 102, this signifying the option of re-use in some circumstances as described herein. The rocket motor 10 may then be ignited and the rocket may then be flown.

Note, NAR/NFPA certification has been typically required for delay modification; i.e., consumer rocketry rules have not allowed consumer modified ejection or delay modification unless pre-certified by NFPA. This may be due to the fixed motor size created by a pre-formed casing with one pre-affixed end closure, aft or fore; the maximum amount of propellant (and other combustibles), then being fixed as well. Thus, either or both of component parts or a kit may be provided by a manufacturer or distributor to achieve the combination or combinations hereof. A component may be a housing with a fore or aft closure affixed. Another cooperative component therewith would be the other of the closures, not priorly affixed. Propellant in appropriate size/quantity may be a further component. A kit could include each of these and perhaps also instructions for assembly and/or use.

Alternative implementations abound. As mentioned, it may be that the forward closure or bulkhead 21 is substantially integral with the housing 11 rather than the aft closure 12 being so. Then, after loading internal propellant 16 (typically with a liner 17), such a discrete aft closure 12 may be subsequently attached to the housing 11. In such case, this could also be either limited re-use or single use, thus, such an aft closure 12 may be attached to the housing either with epoxy, or other adhesive, for substantially permanent affixation, and thus single use; or, with an O-ring, and a greased connection, screwed or otherwise connected to assure a sufficient seal, though being openable for re-use. In such an exemplar, a delay charge arrangement may be used as well, being insertable into the fore closure typically prior to insertion of propellant; however, it may prove less simple with a fixed fore closure to insert such a delay charge 26 with associated hardware (o-ring 25, insulator 24, spacer 27, separator 22) in and through the length of the rocket motor housing 11. An alternative here is to use no delay, or a different kind of delay, as for example an electronic (timing, altitude or speed or g-force sensing) delay. Note, such alternative delays (or no delays) could be used with an affixed aft closure system as shown in FIG. 1, as well. Other ejection mechanisms (or lack thereof), other than black powder charges disposed in a fore closure ejection well, may be used as well; of particular note, these could be disparate from the motor, and otherwise controlled or effectuated. In disparate or non-existent delay and/or ejection mechanism situations, the rocket motor 10 may be simplified elementally to a housing or casing 11, an aft closure 12 with nozzle 14, and a fore closure 21 (in such instance, the fore closure having no openings, and serving substantially the sole purpose of closing the fore end of the rocket motor). The form defines a propellant combustion chamber in the housing 11, between the fore and aft closures to direct exhaust gases through the nozzle 14. And, in a loadable, single use or limited re-use form as described herein, the housing 11 may have either the aft closure or the fore closure integral therewith or permanently or substantially permanently affixed thereto. The other of the aft and fore closure is then connectable to the housing either in a relatively permanent fashion (e.g., epoxy) for single use, or removably attachable for re-use.

From the foregoing, it is readily apparent that new and useful embodiments of the present systems, apparatuses and/or methods have been herein described and illustrated which fulfill numerous desiderata in remarkably unexpected fashions. It is, of course, understood that such modifications, alterations and adaptations as may readily occur to the artisan confronted with this disclosure are intended within the spirit of this disclosure which is limited only by the scope of the claims appended hereto.

The invention claimed is:

1. A single use rocket motor system comprising:
 a rocket motor housing having a bulkhead end and a nozzle end;
 a rocket motor nozzle fixed in the nozzle end of the housing;
 one or more propellant grains disposed within the housing between the nozzle end and the bulkhead end of the housing;
 a single use delay bulkhead disposed in the housing at the bulkhead end of the housing; the single use delay bulkhead having:
  a forward end having an enclosing wall projecting forward of the rocket motor housing, the forward end enclosing wall defining an ejection charge well, and,
  the delay bulkhead having a delay well opposite the ejection well, the delay well disposed to a contain a delay;
  the ejection well and the delay well having a channel disposed therebetween;
  the ejection well and channel being configured for user modification of a delay time;
  the single use rocket motor delay bulkhead being configured to be modifiable from the forward end thereof; and a tool for modifying the delay, the tool having
  a body having a drill bit aperture defined therethrough and at least one channel defined therein;
  a drill bit configured to be operatively disposed in and through the drill bit aperture;
the delay being modifiable by the tool, the tool being configured for engagement with the enclosing wall through the channel of the tool with the forward end of the delay bulkhead with the delay in the delay well for removing an amount of delay material therefrom.

* * * * *